(12) United States Patent
Wang

(10) Patent No.: US 10,645,182 B2
(45) Date of Patent: May 5, 2020

(54) SOCIAL NETWORK INFORMATION MATCH-UP SYSTEM AND METHOD THEREOF

(71) Applicant: Wei-Shan Wang, Taipei (TW)

(72) Inventor: Wei-Shan Wang, Taipei (TW)

(*) Notice: Subject to any disclaimer, the term of this patent is extended or adjusted under 35 U.S.C. 154(b) by 235 days.

(21) Appl. No.: 15/455,519

(22) Filed: Mar. 10, 2017

(65) Prior Publication Data
US 2018/0262586 A1  Sep. 13, 2018

(51) Int. Cl.
*H04L 29/08* (2006.01)
*G06Q 50/00* (2012.01)
*H04L 12/58* (2006.01)
*G06Q 30/02* (2012.01)

(52) U.S. Cl.
CPC .......... *H04L 67/26* (2013.01); *G06Q 50/01* (2013.01); *H04L 51/046* (2013.01); *H04L 51/32* (2013.01); *G06Q 30/0282* (2013.01); *H04L 67/20* (2013.01)

(58) Field of Classification Search
CPC ....... H04L 67/02; H04L 67/306; H04L 67/16; H04L 67/26; H04L 50/01; H04L 51/32; G06Q 30/02; G06Q 30/0201; G06Q 30/0282; G06Q 50/01

USPC ........................................ 709/206
See application file for complete search history.

(56) References Cited

U.S. PATENT DOCUMENTS

| | | | | |
|---|---|---|---|---|
| 2011/0288912 | A1* | 11/2011 | McCrea | G06Q 30/02 705/14.2 |
| 2013/0346877 | A1* | 12/2013 | Borovoy | H04L 65/403 715/753 |
| 2014/0101134 | A1* | 4/2014 | Bohrer | G06Q 30/02 707/722 |
| 2015/0170233 | A1* | 6/2015 | Lisitsa | H01L 23/427 705/26.1 |
| 2016/0335704 | A1* | 11/2016 | Chin | G06Q 30/0631 |
| 2017/0048184 | A1* | 2/2017 | Lewis | H04L 51/10 |
| 2017/0091843 | A1* | 3/2017 | Zeigler | G06Q 30/0601 |

* cited by examiner

*Primary Examiner* — Ruolei Zong
(74) *Attorney, Agent, or Firm* — Chun-Ming Shih

(57) ABSTRACT

The present invention provides a social network information match-up system. The system receives the request message of the collaboration information to be published from the user end (demand end), and is able to promote the collaboration information of the user end to other user ends using the system. It also help other user end (request end) to publish collaboration information on the exclusive webpage of the user end on the social network website via the system according to the assistance request of the user end (support end).

11 Claims, 24 Drawing Sheets

| publisher | A fans page |

| collaboration project type |
| partner post for you | user number limitation of collaboration fans club
100人-1000000 people type of collaboration fans club
outdoor/sports accessory collaboration description for promotion post
Hello, this is A fans page, we come from US.....................

demands of the collaboration project:
(1)time period of the activity is not limited, and joined fans page managers are required to post for promotion.
(2)after the collaboration is accomplished, we will check whether the description of post is correct or not, and the collaboration is finished after the check is confirmed.

collaboration description for promotion post
I am going to recommend you a thing...................

Let's collaborate messages:(0)

leave your opinions...

submit

FIG.9

Let more fans see you!

demands of the collaboration project:
(1) the duration is one week from 12/21, and the joined fans page managers are required to promote the post of the activity.
(2) after the collaboration is accomplished, we will check whether the description of post is correct or not, and the collaboration is finished after the check is confirmed.. . . . . . . . . . . . . . . . . . . . . . . . . . . .

. . . . . . . . . . . . . . . . . . . . . . . . . . . . . . . . . . . . . . . . . . . . . . . . . . . . . . . . . . . . .

collaboration description for promotion post

Hey~ I would like to share a fans page with all you guys. . . . . . . . . . . . .
. . . . . . . . . . . . . . . . . . . . . . . . . . .
. . . . . . . . . . . . . . . . . . . . . . . . . . . . . . . . . . .
. . . . . . . . . . . . . . . . . . . . . . . . . . . . . . . . . . . . . . . . . . . . . . . . . . . . . .
. . . . . . . . . . . .
. . . . . . . . . . . . . . . . . . . . . . . . .

[ ⊚ opposite party is executing ]    [ ✕ cancel collaboration ]    [ 💬 read messages ]

FIG.14

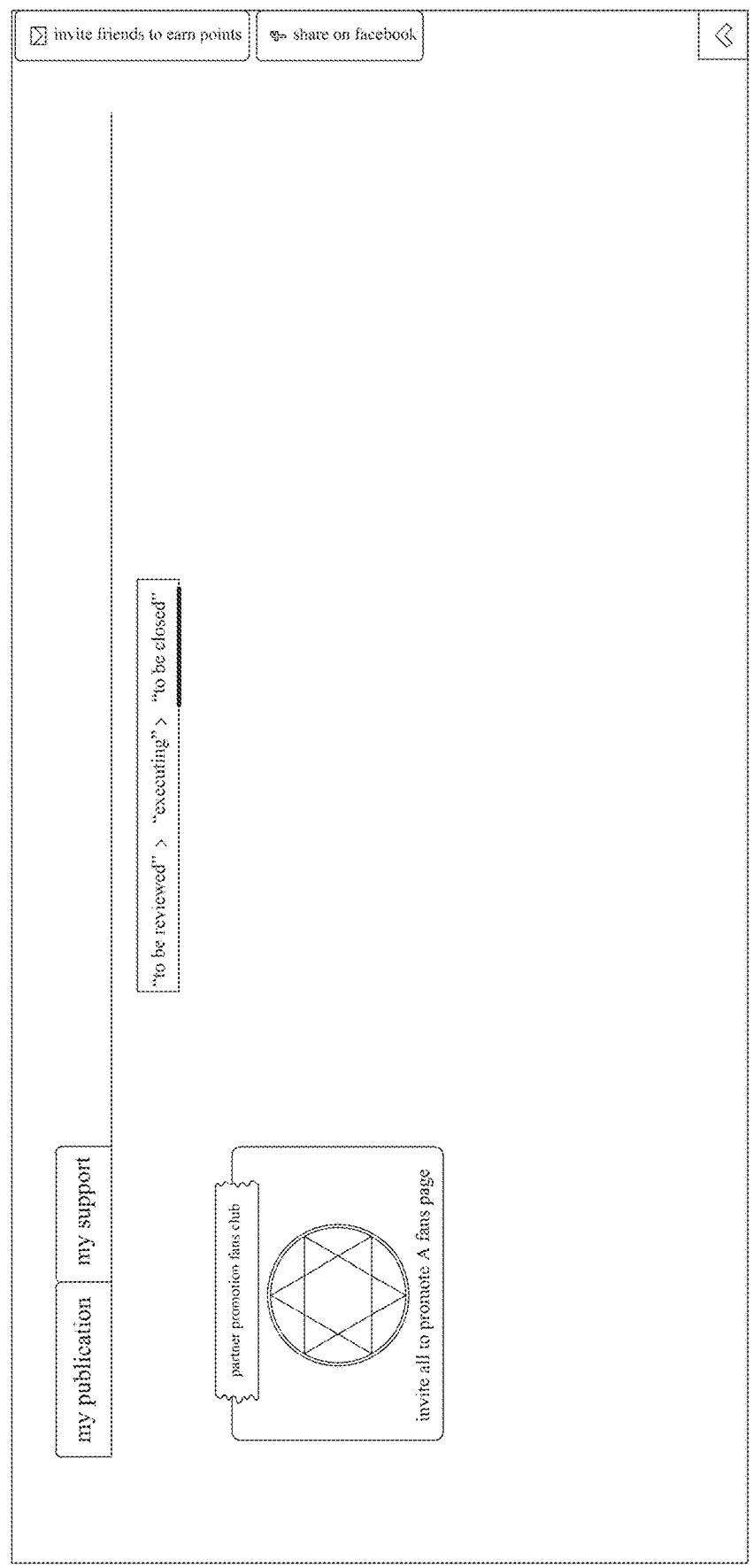

Let more fans see you!

demands of the collaboration project:
(1)the duration is one week from 12/21, and the joined fans page managers are required to promote the post of the activity.
(2)after the collaboration is accomplished, we will check whether the description of post is correct or not, and the collaboration is finished after the check is confirmed..........

collaboration description for promotion post

Hey~ I would like to share a fans page with all you guys.................

⇐ not pass, returned | ✓ confirm accomplish | ☺ read article

FIG.16

SOCIAL NETWORK INFORMATION MATCH-UP SYSTEM AND METHOD THEREOF

BACKGROUND OF THE INVENTION

1. Field of the Invention

The present invention is related to social network. More particularly, the present invention is related to a social network information match-up system and method thereof.

2. Description of the Prior Art

As the development of internet, various network services are brought up continuously. Recently, social network is the most popular service. Generally, social network means the individual member (user end) uses the mutual communication channel provided by the social network providers to form various mutual communication connections. Since the social network has become the new channel for fast information exchange and share, the user end can use the network service of social network and the social network has become the essential part of daily life of many users.

There are many social network websites around the world, such as famous social network websites as: Google+, Myspace, LinkedIn, Twitter, Facebook, and etc. In China, there are RenRen, Qzone, BaiduTeiba, SinoWeibo, and T-QQ Weibo.

The social network website is able to provide channel for daily social life of people and usually gathers may users. It has become essential part of user in daily life. Also the social network websites add more service such as web marketing service, such as exclusive webpage to government, company, or celebrities (such as Facebook fans webpage, fans webpage on Sino Weibo). Thus the user end is able to know information from the exclusive webpage of government, company, or celebrities (such as post, video, advertisement, app, or other information), and can stimulate web marketing business.

For the social network to promote web marketing service and precisely evaluate marketing or advertisement effect, it is important to know the use behavior, category, and use status analysis of the user end of social network website. For example, Facebook provides fans exclusive webpage service and the management of fans exclusive webpage can use particular Insight tool provided by Facebook to quantize the feedback status of user end checking fans exclusive webpage, post, video, or advertisement. It is also able to use the data analysis generated from the insight report to improve the way of marketing and reaching to the user end of the fans exclusive webpage. Also, other social network website has similar function and analysis tool, such as "fans tone" and microdata function of Sino Weibo.

To enhance the web marketing service of the social network website, it is essential to increase the number of user ends of exclusive webpage (such as the number of user ends pressing "like" click means the number joining the fans exclusive webpage). However, the conventional social network website can only make the manager of exclusive webpage to passively provide information. For example, the manager of fans exclusive webpage can post article on the fans exclusive webpage of Facebook to increase exposure possibility of the fans exclusive webpage and attracts user end's attention. Or the user end can repost the message from the fans exclusive webpage (such as: "share" and recommendation of fans exclusive webpage on Facebook, "share" on LinkedIn, "Tweet" on Twitter) to invite other user end to join the fans exclusive webpage. Or the user can click "like", reach, or reply to the post on the fans exclusive webpage (such as: Facebook, LinkedIn, and Twitter) to induce the friends of the user end (i.e. the other user ends in the same social network website) in social network to view the fans exclusive webpage. But there is no efficient method to enhance the possibility of letting the user end join the fans exclusive webpage or increase the exposure possibility of the messages.

Also, there is no channel for the user end of fans exclusive webpage to recommend or promote the user end's exclusive webpage via other exclusive webpage's recommendation or promotion. Thus, it is unable to deliver the message of "willing to be recommended" to other user end (such as other exclusive webpage). Also, it is unable to examine whether the post or related information on the user end's exclusive webpage is allowed to be repost by other exclusive webpage. Especially, when the post on the exclusive webpage is determined to be unwilling to be repost by other not proper exclusive webpage, it may cause inconvenience. For example, the children education exclusive webpage may be unwilling to be recommended by the exclusive webpage opposite to the children education (such as the violent or porn exclusive webpage). But the conventional social network website is unable to stop it from happening.

As aforementioned, how to enhance the exposure rate of the user end's exclusive webpage and how to make more other user ends know the self-owned exclusive webpage in the social network to increase the number of user ends joining the self-owned exclusive webpage, or to increase the possibility of making the user ends join, view, or reach the self-owned exclusive webpage and screen the chance of being promoted by other exclusive webpages of the self-owned exclusive webpage, are the problems needed to be solved urgently.

SUMMARY OF THE INVENTION

As the aforementioned conventional technologies being unable to provide efficient method to increase exposure possibility of exclusive webpage, or being unable to examine whether the exclusive webpage could be recommended by other's exclusive webpage, one objective of the present invention is to enable the manager of the exclusive webpage of the social network website being able to promote other's exclusive webpage on his or her exclusive webpage. Another objective of the present invention is to provide the demand of promoting the exclusive webpage of oneself to other exclusive webpages. Another objective of the present invention is to enable the manager of the exclusive webpage to examine or screen related information before the articles posted on the exclusive webpage or the related collaboration information is recommended or shared by others. Another objective of the present invention is to further recommend or match up exclusive webpages being able to collaborate with each other by using the quantitative analysis tools to enhance web marketing. Thus, the issues of conventional technology of not easy to increase exposure possibility and not able to examine whether the exclusive webpage of oneself is recommended by other exclusive webpages can be solved.

According to one objective of the present invention, it is to provide a social network information match-up system being connected to the social network website, at least one demand end and at least one support end, each demand end and support end being members of the social network website. The system comprises an information storage unit, a match-up module, and a push module. The match-up module is configured to execute following operations of: the match-up module being configured to receive a collaboration information from each demand end, wherein the collaboration information is going to be inputted in the demand end and comprises collaboration status description and request content, wherein the collaboration and the source information representing the input source of demand end are stored in the information storage unit; the match-up module being configured to retrieve at least one collaboration information and corresponding demand end to the collaboration end according to one supporting request from each support end, and the support end being able to select whether to collaborate with one of the demand ends; the match-up module being configured to collaborate with the demand end according to the support ends and generate a push message. The push module is configured to receive the push message from the match-up module, wherein the push module is configured to retrieve the collaboration information of the selected demand end from the information storage unit according to the push message, and publish the collaboration information of the selected demand end on the exclusive webpage of the support end on the social network.

It further comprises a log-in module, wherein the log-in module is configured to be provided to each demand end and support end for logging in the match-up system as the user end of the match-up system, and to enable each application function of the demand end or support end to be used by the match-up system that is restricted before logging in the social network website, and to make the related information of user end can be retrieved from social network, also the push module is able to publish the supporting request on the social network website.

It further comprises a data collection module and a statistics database. The data collection module is configured to collect the activity status statistics data of the user end on the exclusive webpage of the social network website, and the data collection module is configured to collect the use status statistics data in the match-up system, and store the activity status statistics data and the use status statistics data in the statistics database.

The activity status statistics data comprises the reach rate, "like" click number, share number, and total hit number of each supporting request on the exclusive webpage, fans number or attender number of supporter, wherein the use status statistics data of the match-up system represents the supporting number of the user end as the support end, the number of being helped by the support end as a demand end, or the mutual supporting number among each user end. For example, it comprises the content of collaboration information, number of log in system, and etc.

It further comprises a data output module. The data output module is connected to the match-up module and the statistics database, and is configured to output the activity status statistics data and collaboration information stored in the statistics database to the user end from the statistics database according to the data search request from the user end.

The collaboration information comprises a collaboration mode description and an assistance request description, wherein the collaboration mode description comprises a figure, a collaboration project name, a collaboration project type, a population number of fans group needed to collaborate with, a type of fans group needed to collaborate with, and a collaboration description, and the assistance request description comprises at least one or combination of text, image, video, and hyperlink.

The social network information match-up system further comprises a recommend module being connected to the statistics database, and the recommend module at least comprises a match-up recommend criteria combination and a support recommend criteria combination. The match-up recommend criteria combination comprises at least one of the activity status statistics data and at least one of the use status statistics data related to the present user end for generating at least one another user end as the recommended candidate to be outputted on the output screen of the present user end after logging in the system. The support recommend criteria combination comprises at least one of the activity status statistics data and at least one of the use status statistics data and collaboration information for generating at least one recommended demand candidate representing one another user end as the demand end requesting assistance by support end to be outputted on the output screen of the present user end after logging in the system.

The recommend module further comprises an initiative recommend criteria combination. The recommend module is connected to the match-up module.

The recommend module is configured to generate at least one another user end as the recommended candidate to be outputted on the output screen of the present user end after logging in the system according to a predetermined initiative recommend criteria combination, and the initiative recommend criteria combination comprises at least one of the activity status statistics data and at least one of the use status statistics data related to the present user end. After the match-up module receives the collaboration information of each demand end, the match-up module is configured to output each recommended support end for the demand end to select. When the user end selects one recommended support end, the match-up module is configured to issue an initiative request assistance message to the selected recommended support ends when the user end, as the recommended support end, receives the initiative request assistance message, the match-up module is configured to generate an option of agree the initiative assistance message and an option of deny the initiative assistance message for the user end, as the recommended support end, to select. When the user end, as the recommended support end, agrees to the initiative assistance option, the match-up module is configured to generate the push message and the match-up module transmits the push message to the push module. The push module is configured to retrieve the content of the support request of the collaboration information of the demand end that issues the initiative request assistance message from the information storage unit according to the push message. The push module is configured to publish the content of the support request on the exclusive webpage of the user end, as the recommended support end, on the social network website. When the user end, as the recommended support end, denies the initiative assistance option, the match-up module is configured to generate the deny collaboration message. The match-up module is configured to transmit the deny collaboration message to the support end.

One objective of the present invention is to provide a social network information match-up method. The method comprises steps of: executing a match-up module of a match-up system to receive at least one collaboration information from at least one demand end; storing the collaboration and the source information representing the input source of demand end in an information storage unit of the match-up system; executing the match-up module to retrieve at least one of the collaboration information and the corresponding demand end to each support end from the information storage unit according to one support request of at least one support end; executing the match-up module to provide selection ability to each support end to determine whether to collaborate with any demand end; executing the match-up module to generate a request collaboration message according to the collaboration information of the demand end selected by the support end; transmitting the request collaboration message to a demand end corresponding to the selected collaboration information; executing the push module to retrieve the content of the support request of the collaboration information of the selected demand end from the information storage unit according to the push message; executing the push module to publish the content of the support request of the collaboration information of the selected demand end on the exclusive webpage of the support end on the social network website; executing the match-up module to receive an agree collaboration message or a deny collaboration message from the corresponding demand end in response to the request collaboration message; when the match-up module receives the agree collaboration message, generating a push message according to the agree collaboration message and transmits the push message to the push module; executing the push module to retrieve the content of the support request of the collaboration information of the selected demand end from the information storage unit according to the push message; executing the push module to publish the content of the support request of the collaboration information of the selected demand end on the exclusive webpage of the support end on the social network web site; when the match-up module receives the deny collaboration message from the demand end, generating a deny collaboration notice message according to the deny collaboration message and transmits the deny collaboration notice message to the support end.

The method further comprises step of before executing the match-up module to receive at least one collaboration information from at least one demand end, or before the support end issuing the support request, it further comprises a step of providing a log-in module to each demand end or support end for logging in the match-up system and to execute the match-up system to access each application function of the demand end or support end released on the social network website after log-in, and the push module is configured to publish the support request content on the exclusive webpage of the support end on the social network website.

When the social network information match-up system confirms that the demand end or the support end registers by the log-in module, the social network information match-up system is configured to execute a data collection module being configured to collect an activity status statistics data of the user end on the exclusive webpage of the social network website, and store the activity status statistics data and the use status statistics data in a statistics database.

After the social network information match-up system stores the activity status statistics data and the use status statistics data in the statistics database, when a data output module of the match-up system receives a data search request, the data output module is configured to output the activity status statistics data to the user end from the statistics database, wherein the activity status statistics data represents the collaboration information of the demand end published on at least one support end webpage of the social network website.

As aforementioned, the present invention at least has the following advantages:
1. Each support end is able to select from a plurality of collaboration information of demand ends, and the support end is able to assist demand end to promote collaboration information.
2. The collaboration information of each demand end that is going to be published can be stored in the data storage unit. When each support end provides support request, the support end can select the collaboration information from all collaboration information. Thus, it is able to increase exposure possibility of self-owned collaboration information to be promoted in the social network website by the support end.
3. Each demand end is able to examine whether the self-owned collaboration information is willing to be promoted by other support end.
4. Each demand end is able to view the result of promotion made by each support end, which is the reference for the demand end to determine whether to collaborate with a particular support end.

BRIEF DESCRIPTION OF THE DRAWINGS

FIG. 9 shows preview collaboration webpage of one embodiment of the present invention;

FIG. 14 shows "demand to be executed check webpage" of one embodiment of the present invention;

FIG. 15 shows "demand to be closed webpage" of one embodiment of the present invention;

FIG. 16 shows "demand to be closed confirm webpage" of one embodiment of the present invention;

DETAILED DESCRIPTION OF THE PREFERRED EMBODIMENT

To explain the technical features, content, advantage, and effect of the present invention, the detailed embodiment and corresponding figures are described as below. However, the figures are illustrated as example and may not show the real ratio and/or precise arrangement when practicing the present invention. Thus, the ratio and arrangement of the figures is not intended to limit the scope of claims of the present invention.

Figure 1:
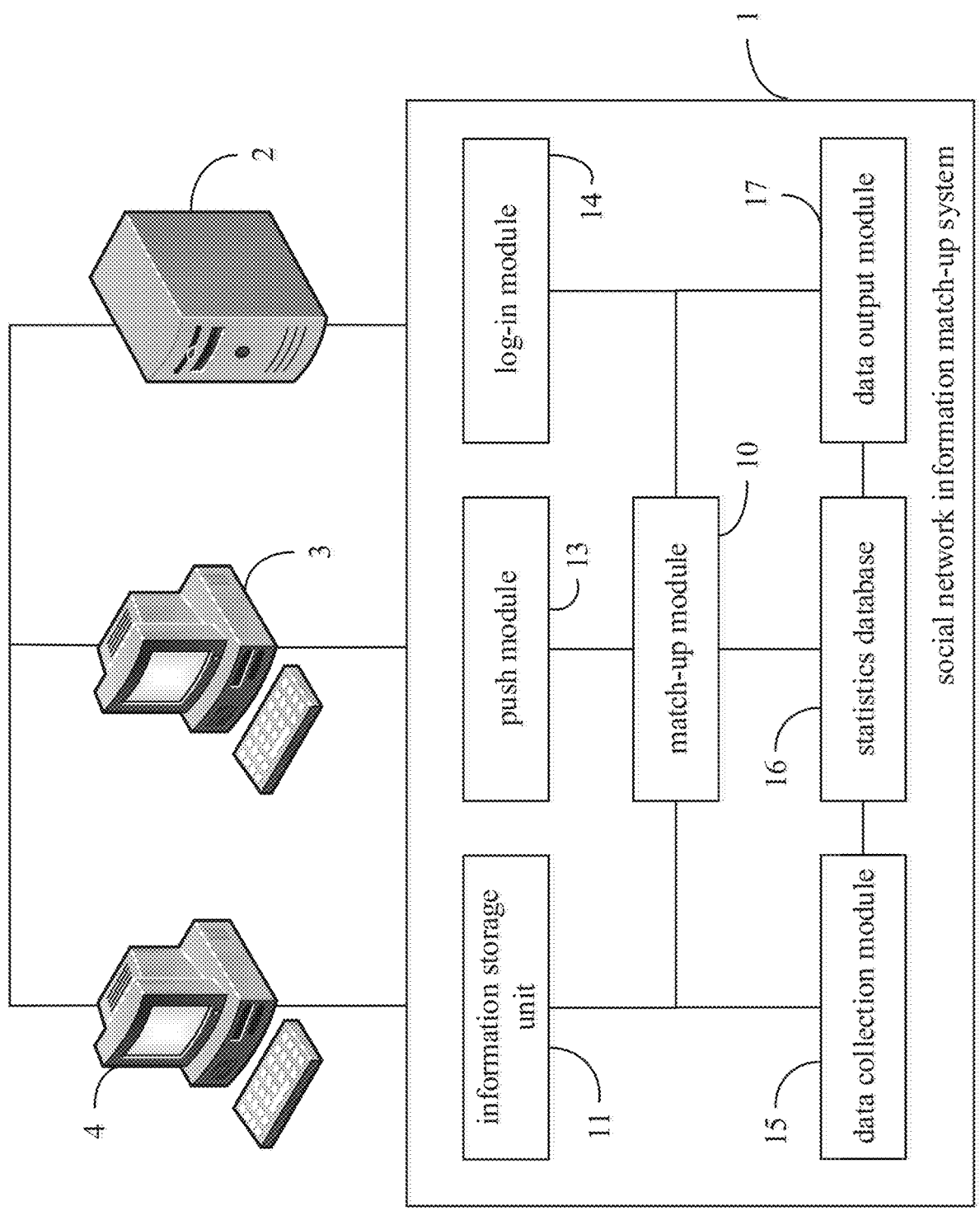
FIG. 1 shows the system structure of the present invention.

FIG. 1 shows the social network information match-up system of the present invention. The social network information match-up system 1, hereinafter match-up system 1, is connected to the social network website 2, at least one demand end 3 and at least one support end 4, each demand end 3 and support end 4 being members of the social network website 2. The match-up system 1 can be a third party website being able to use the application programming interface, API, of the social network website 2, and at least comprises a match-up module 10, an information storage unit 11, and a push module 13.

The match-up module 10 is configured to execute following operations of: the match-up module 10 being configured to receive a collaboration information from each demand end 3, wherein the collaboration information is going to be inputted in the demand end 3 and comprises collaboration status description and request content, wherein the collaboration and the source information representing the input source of demand end 3 are stored in the information storage unit 11. The match-up module 10 is configured to retrieve at least one collaboration information stored in the information storage unit 11 and transmit to the support end 4 according to one supporting request from the support end 4, and the support end 4 is able to select whether to collaborate with one of the demand ends 3. The match-up module 10 is configured to collaborate with the at least one demand end 3 according to the support ends 4 and generate a push message to the push module 13. The push module 13 is configured to receive the push message, wherein the push module 13 is configured to retrieve the collaboration information of the selected demand end 3 from the information storage unit 11 according to the push message, and publish the collaboration information of the selected demand end 3 on the exclusive webpage of the support end 4 on the social network 1. That is, the assistance request content of demand end 3 is successfully matched up to the support end 4. In the present invention, when the match-up module 10 selects at least one demand end 3 according to the support end 4, a request collaboration message is generated and transmitted to the demand end 3. The match-up module 10 is configured to receive an agree collaboration message or a deny collaboration message from the corresponding demand end 3 in response to the request collaboration message. If the demand end 3 replies to agree with the collaboration message, then the assistance request content of the demand end 3 is published on the exclusive webpage of the support end 4 on the social network website 2. Or, the match-up module 10 generates a deny collaboration notice message according to the deny collaboration message, and transmits the deny collaboration notice message to the support end 4, that means the assistance request content of the demand end 3 is unwilling to be published by the support end 4, and the match-up is failed.

In the present invention, the match-up system 1 further comprises a log-in module 14 (such as the API of Facebook being provided for log-in authentication to third party application program or website), wherein the log-in module 14 is configured to be provided to each demand end 3 and support end 4, as the member of the social network website 2, for logging in the match-up system 1 as the user end of the match-up system 1, and to enable each application function of the demand end 3 or support end 4 to be used by the match-up system that is restricted before logging in the social network website, and to make the related information of user end can be retrieved from social network, also the push module is able to publish the supporting request on the social network website.

In the present invention, the match-up system 1 further comprises a data collection module 15 and a statistics database 16. The data collection module 15 is configured to collect the activity status statistics data of the user end on the exclusive webpage of the social network website, and the data collection module 15 is configured to collect the use status statistics data in the match-up system 1, and store the activity status statistics data and the use status statistics data in the statistics database 16.

In the present invention, the match-up system 1 further comprises a data output module 17. The data output module 17 is connected to the match-up module 10 and the statistics database 16, and is configured to confirm that the user end as the demand end 3 has been matched up successfully according to the collaboration information from the match-up module 10 in response to the data search request inputted by the user end, and then to output the activity status statistics data to the user end from the statistics database 16, wherein the activity status statistics data represents the supporting request of the user end as the demand end being published by the supporting end.

In the present invention, the match-up system 1 further comprises a recommend module 18 being connected to the statistics database 16, and the recommend module 18 at least comprises a match-up recommend criteria combination and a support recommend criteria combination; wherein the match-up recommend criteria combination comprises at least one of the activity status statistics data and at least one of the use status statistics data related to the present user end for generating at least one another user end as the recommended candidate to be outputted on the output screen of the present user end after logging in the system; the support recommend criteria combination comprises at least one of the activity status statistics data and at least one of the use status statistics data and collaboration information for generating at least one recommended demand candidate representing one another user end as the demand end requesting assistance by support end to be outputted on the output screen of the present user end after logging in the system. Thus, when the user end log in system, the message related to recommended candidate recommended by the system or recommended demand candidate can be seen instantly.

The recommend module 18 further comprises an initiative recommend criteria combination. The recommend module 18 is connected to the match-up module 10.

The recommend module 18 is configured to generate at least one another user end as the recommended candidate to be outputted on the output screen of the present user end after logging in the system according to a predetermined initiative recommend criteria combination, and the initiative recommend criteria combination comprises at least one of the activity status statistics data and at least one of the use status statistics data related to the present user end. After the match-up module 10 receives the collaboration information of each demand end 3, the match-up module 10 is configured to output each recommended support end for the demand end to select. The match-up module 10 is configured to issue an initiative request assistance message to the selected recommended support ends, when the user end receives the initiative request assistance message, the match-up module 10 outputs agree initiative assistance option or deny initiative assistance option to the user end, as the recommended support end. When the user end, as the recommended support end, receives the initiative request assistance message, the match-up module 10 is configured to generate an option of agree the initiative assistance message and an option of deny the initiative assistance message for the user end, as the recommended support end, to select. When the user end, as the recommended support end, agrees to the initiative assistance option, the match-up module 10 is configured to generate the push message and the match-up module 10 transmits the push message to the push module 13. The push module 13 is configured to retrieve the content of the support request of the collaboration information of the demand end 3 that issues the initiative request assistance message from the information storage unit 11 according to the push message. The push module 13 is configured to publish the content of the support request on the exclusive webpage of the user end, as the recommended support end 4, on the social network website. That means the assistance request content of demand end 3 is successfully matched up to the support end 4. When the user end, as the recommended support end, denies the initiative assistance option, the match-up module 10 is configured to generate the denying collaboration message. The match-up module 10 is configured to transmit the denying collaboration message to the support end.

In another embodiment of the present invention, the log-in module 14 is configured to enable the demand end 3 and the support end 4 log in the match-up system 1 as the member of the match-up system 1. Thus the demand end 3 and the support end 4 can accomplish or proceed most functions of the system as the user end of the social network website. The main difference is, before the push module 13 release the assistance request content on the exclusive webpage of the support end 4 on the social network website 2, the push module 13 is configured to ask the support end 4 agreeing to open each application function to the match-up system 1 and social network website 2, thus the push module 13 can release the selected assistance request content on the exclusive webpage of the support end 4 on the social network website 2.

As aforementioned, the demand end 3 and the support end 4 are configured to log in the match-up system 1 via the log-in module 14. As long as the demand end 3 and the support end 4 agree to open each application function to the match-up system 1 and social network website 2, the data collection module 15 of the match-up system 1 is able to collect the statistics of activities corresponding to the assistance request content of exclusive webpage published on the social network website 2, and store the statistics in the statistics database 16 of the social network website. When the data output module 17 receives data search request from the input of demand end 3, the data output module 17 first confirms the successfully matched collaboration information of the demand end 3 via the match-up module 10, then outputs the successfully matched collaboration information of the demand end 3 to the demand end 3.

In the present invention, the match-up module 10, information storage unit 11, push module 13, log-in module 14, data collection module 15, statistics database 16, data output module 17 and recommend module 18 are written based on webpage edit software, which comprises at least one webpage object to accomplish aforementioned functions or objectives.

Figure 2:
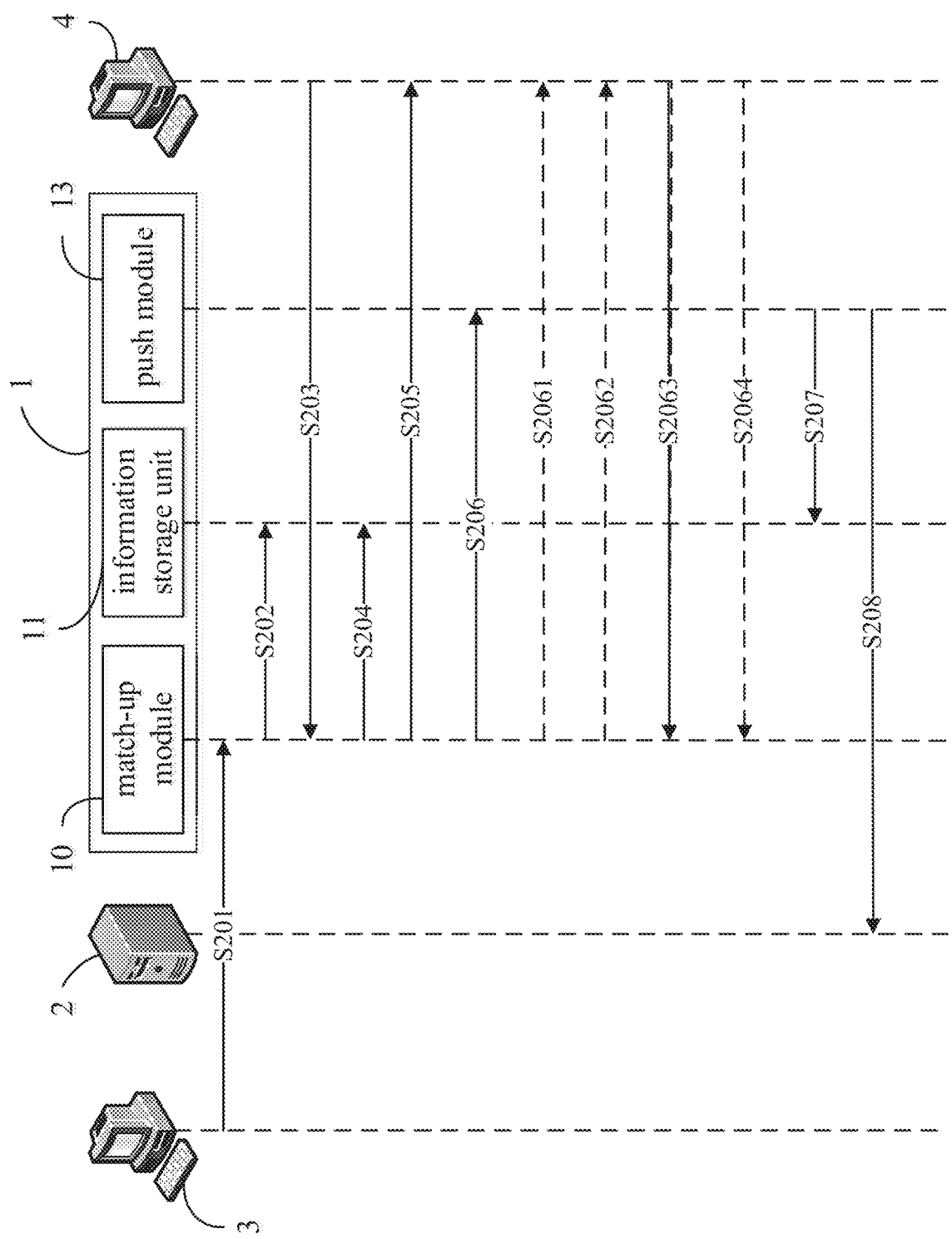
FIG. 2 shows the flow diagram of the present invention.
Figure 3:
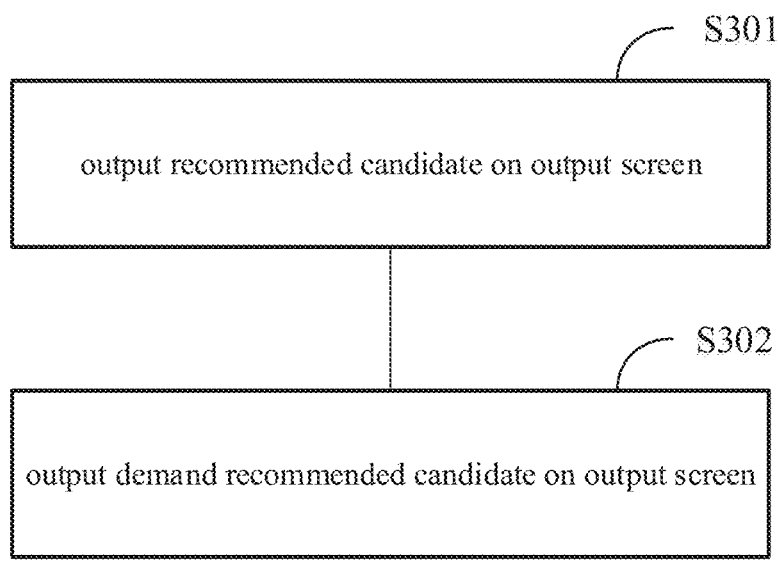
FIG. 3 shows the flow diagram of generating recommended candidate of the present invention.

FIG. 2 shows the social network information match-up method of the present invention, which comprises the steps of:

(S201) executing a match-up module of a match-up system to receive at least one collaboration information from at least one demand end, wherein the collaboration information comprises collaboration status description and assistant request content;

(S202) executing the match-up module to store the collaboration and the source information representing the input source of demand end in an information storage unit of the match-up system;

(S203) executing the match-up module to receive an assistance request from the support end;

(S204) executing the match-up module to retrieve at least one of the collaboration information and the corresponding demand end information to each support end from the information storage unit;

(S205) executing the match-up module to provide collaboration information and corresponding demand end information to the support end, and provide selection ability to each support end to determine whether to collaborate with any demand end;

(s206) executing the match-up module to generate a push message according to the collaboration information of the demand end selected by the support end and executing the match-up module to transmit the push message to a push module;

(S207) executing the push module to retrieve the content of the support request of the collaboration information of the selected demand end from the information storage unit according to the push message;

(S208) executing the push module to publish the content of the support request of the collaboration information of the selected demand end on the exclusive webpage of the support end on the social network website.

In the present invention, when the match-up module select to collaborate with the collaboration information of at least one demand end according to the support end, the following steps would be executed.

(S2061) executing the match-up module to transmit a request collaboration message to the selected demand end corresponding to the collaboration information;

(S2062) executing the match-up module to ask the corresponding demand end to response with an agree collaboration message or a deny collaboration message corresponding to the collaboration message;

(S2063) when the match-up module receives the agree collaboration message, executing following steps after generating push message;

(S2064) when the match-up module receives the deny collaboration message from the corresponding demand end, generating a deny collaboration notice message;

(S2065) executing the match-up module to transmit the deny collaboration notice message to the support end.

Before executing steps (S201) or (S203), a log-in module of the match-up system is configured to be provided to each demand end and support end for logging in the match-up system, and to enable each application function of the demand end or support end to be used by the match-up system that is restricted before logging in the social network website, and to become one user end of the match-up system. Thus the related information of the user end can be retrieved from the social network website, and the user end can publish assistance request content on the social network website when it acts as a support end. For example, the match-up system can use push module to directly publish the collaboration information of the selected demand end on the exclusive webpage of the support end of the social network website.

In the present invention, when the match-up system is acknowledged that the demand end or the support end logged in via the log-in module, a data collection module of the match-up system is configured to collect the activity status statistics data of the user end on the exclusive webpage of the social network website, and the data collection module is configured to collect the use status statistics data in the match-up system, and store the activity status statistics data and the use status statistics data in the statistics database.

In the present invention, the match-up system stores the activity status statistics data and the use status statistics data in the statistics database. When a data output module of the match-up system receives data search request from the demand end, the data output module output activity status statistics data of the assistance request content of the user end as the demand end to the user end, wherein the assistance request content is published by the support end.

In the present invention, the activity status statistics data comprises the reach rate, "like" click number, share number, and total hit number of each supporting request on the exclusive webpage, fans number or attender number of supporter, but is not limited by the aforementioned data. Generally, the statistics and analysis of activity status of the exclusive webpages that a social network website can provide to the user end can refer to the activity status statistics data, such as the statistics and analysis of insight report of Facebook, or statistics and analysis of microdata of Weibo. Thus, the data collection module 15 can collect the statistics and analysis of activity status of the exclusive webpages of the support end after the assistance request content is published.

In another embodiment, the use status statistics data of the match-up system represents the supporting number of the user end as the support end, the number of being helped by the support end as a demand end, or the mutual supporting number among each user end, or even the use situation of the user end in the system, such as: content of collaboration information, number of log in times, and etc. That is, as long as the behavior of the user end during operation can be counted or analyzed, it falls within the scope of use status statistics data as claimed in the present invention.

In the present invention, the collaboration information comprises a collaboration mode description and an assistance request description, wherein the collaboration mode description comprises a figure, a collaboration project name, a collaboration project type, a population number of fans group needed to collaborate with, a type of fans group needed to collaborate with, and a collaboration description, and the assistance request description comprises at least one or combination of text, image, video, and hyperlink. But the aforementioned description is not intended to limit the present invention.

In the present invention, the match-up system further comprises a recommend module, and when each demand end or support end registers in the match-up system, the match-up system is configured to execute following steps of:
(S301) executing the recommend module to generate at least one another user end as the recommended candidate to be outputted on the output screen of the present user end after logging in the system according to a predetermined match-up recommend criteria combination;
(S302) executing the recommend module to generate at least one recommended demand candidate representing one another user end as the demand end requesting assistance by support end to be outputted on the output screen of the present user end after logging in the system according to a predetermined support recommend criteria.

The match-up recommend criteria combination comprises at least one of the activity status statistics data and at least one of the use status statistics data related to the present user end. The support recommend criteria combination comprises at least one of the activity status statistics data and at least one of the use status statistics data and collaboration information.

Figure 4:
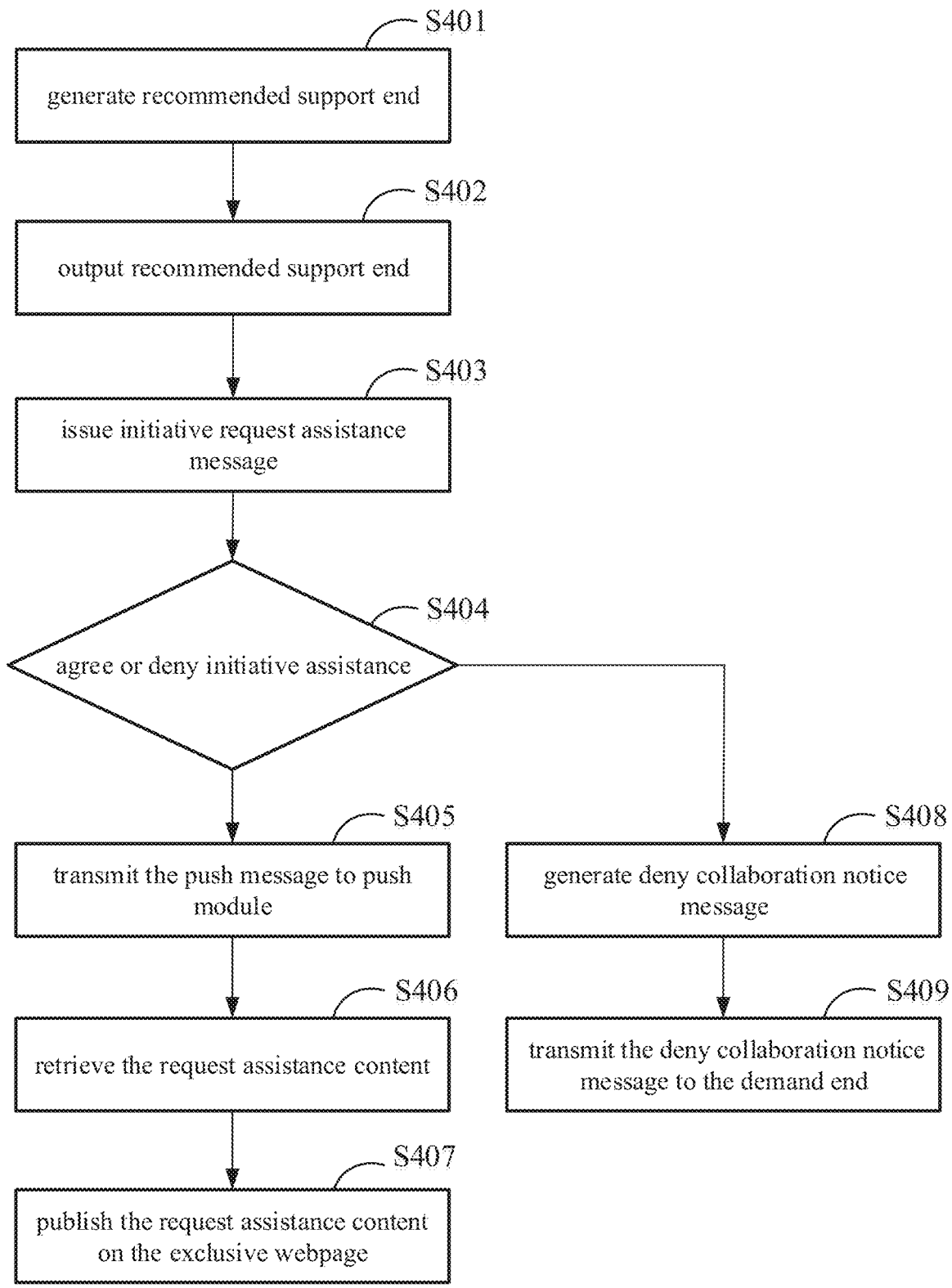
FIG. 4 shows the flow diagram of initiatively request assistance of the present invention.

In the present invention, refer to FIG. 4, after the match-up system receives the collaboration information from each demand end, the match-up system is configured to execute the following steps of:
(s401) executing the recommend module to generate at least one another user end as the recommended candidate according to a predetermined initiative recommend criteria combination;
(S402) after the match-up module receives the collaboration information of each demand end, executing the match-up module to output each recommended support end for the demand end to select;
(S403) executing the match-up module to issue an initiative request assistance message to the selected recommended support ends;
(S404) when the user end, as the recommended support end, receives the initiative request assistance message, executing the match-up module to generate an option of agree the initiative assistance message and an option of deny the initiative assistance message for the user end, as the recommended support end, to select; when the user end, as the recommended support end, agrees to the initiative assistance option, then step (S405) is executed, when the user end, as the recommended support end, denies to the initiative assistance option, then step (S408) is executed;
(S405) executing the match-up module to generate the push message for the match-up module to transmit the push message to the push module;
(S406) executing the push module to retrieve the content of the support request of the collaboration information of the demand end that issues the initiative request assistance message from the information storage unit according to the push message;
(S407) executing the push module to publish the content of the support request on the exclusive webpage of the user end, as the recommended support end, on the social network website;
(S408) when the user end, as the recommended support end, denies the initiative assistance option, executing the match-up module to generate the deny collaboration notice message;
(S409) executing the match-up module to transmit the deny collaboration notice message to the support end.

The initiative recommend criteria combination comprises at least one of the activity status statistics data and at least one of the use status statistics data related to the present user end and is applied to generate at least one another user end as the recommended candidate.

An embodiment is provided to understand the present invention as below.

Figure 5:
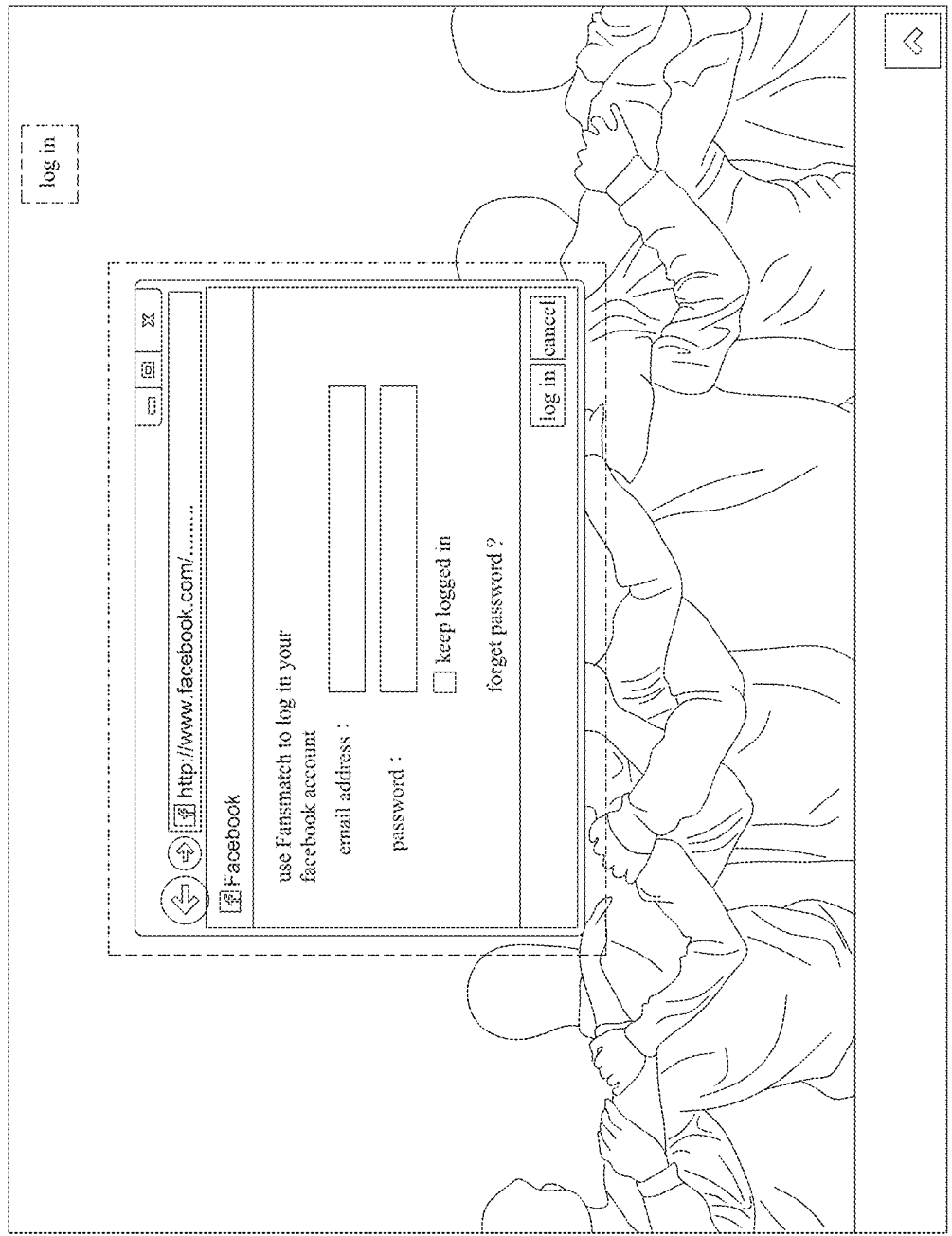
FIG. 5 shows the diagram of one embodiment of how to register in a third party collaboration information match-up website of the present invention.
Figure 6:
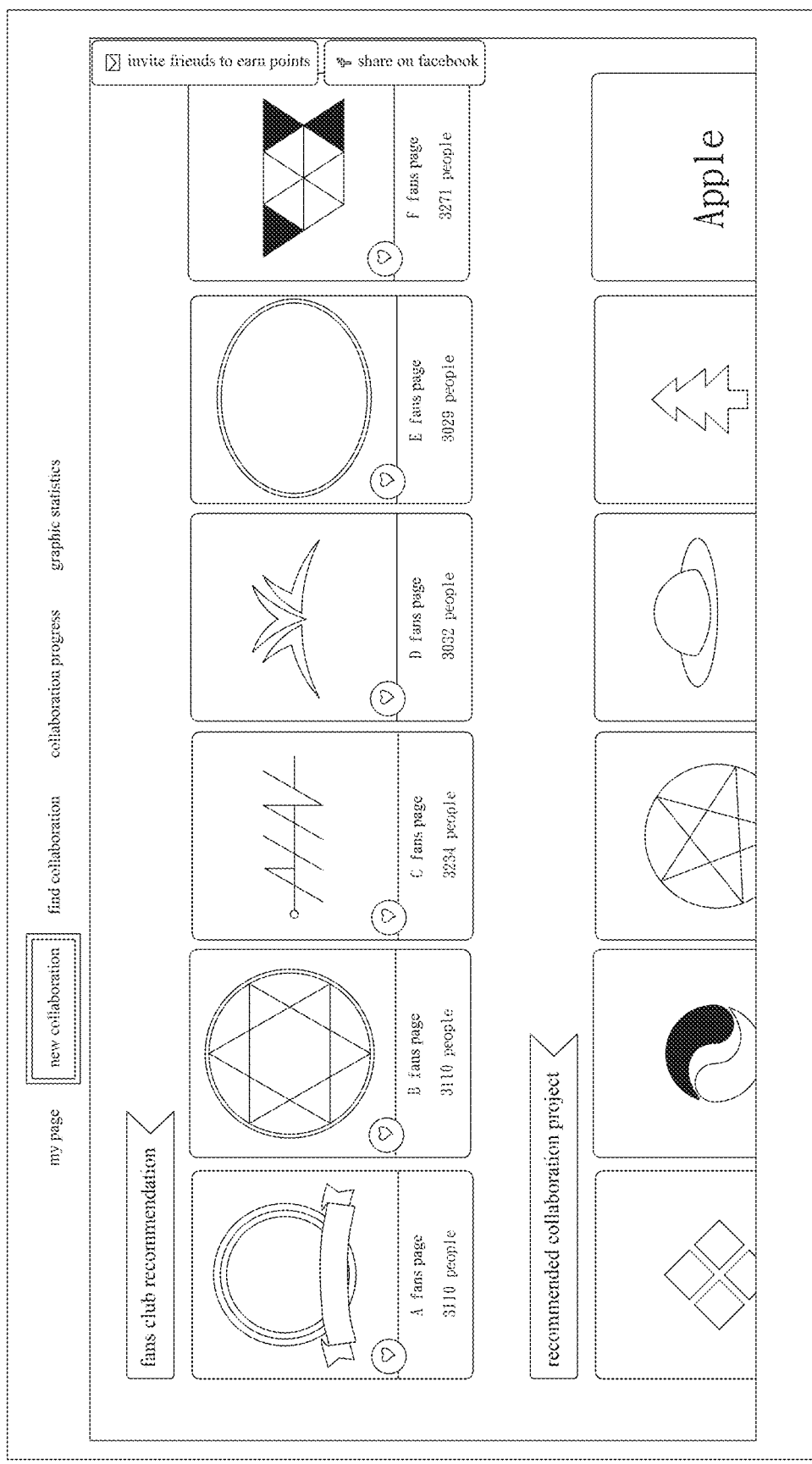
FIG. 6 shows match-up website of one embodiment of the present invention.

Refer to FIG. 5, which shows a third party collaboration information match-up website. When the user end wants to log in the third party collaboration information match-up website, an action of clicking the "login" icon on right-up corner of screen would bring up a log-in screen of account and password blanks of a social network website (such as Facebook), and this is equivalent to the log-in module of the present invention. After that, the user end inputs account and password of the social network website follows by clicking the log in icon. If the log-in of the social network website is verified, it is able to access the third party collaboration information match-up website and access the match-up webpage (as shown in FIG. 6). Below the match-up webpage, figures and description of a plurality of recommended ends are outputted, these are the figures and descriptions recommended by fans club shown in FIG. 6. Meanwhile, the match-up webpage also output figures and descriptions of recommended demand candidates, these are the figures and descriptions of collaboration projects shown in FIG. 6.

Figure 7:
FIG. 7 shows adding collaboration webpage of one embodiment of the present invention.

Refer to FIG. 6 and FIG. 7, when the user end enters the third party collaboration information match-up website, the user end can select "add new collaboration" icon on upper part of match-up webpage to output a new collaboration webpage as shown in FIG. 7. At this time, the user end is the demand end of the present invention, that is, the match-up module enable the user end (demand end) to input collaboration information in the new collaboration webpage. The collaboration information comprises collaboration status description and assistance request content. The collaboration mode description comprises a figure, a collaboration project name, a collaboration project type, a population number of fans group needed to collaborate with, a type of fans group needed to collaborate with, and a collaboration description. Assistance request content is shown as collaboration content. The collaboration project type comprises "partner post for you", "partner promotion fans club", "collaborate to find sponsor", and etc. The user number limitation of fans club of collaboration can be set as multi ranges or self-defined ranges. Collaboration description explains the purposes or content of the collaboration by the user end (demand end). Here the title of the collaboration description is corresponding to the collaboration type of "partner post for you", thus the title is the text content of the project wanted to be promoted, and the collaboration content represents the blanks of assistance request ready to be inputted by the demand end, the demand end can provide contents via the blanks to the support end to publish out. It is not intended to limit the present invention. When the user end competes inputting collaboration information, the user end can click "publish it" option to store the collaboration information and the input source message (demand end) in the information storage unit.

Figure 8:
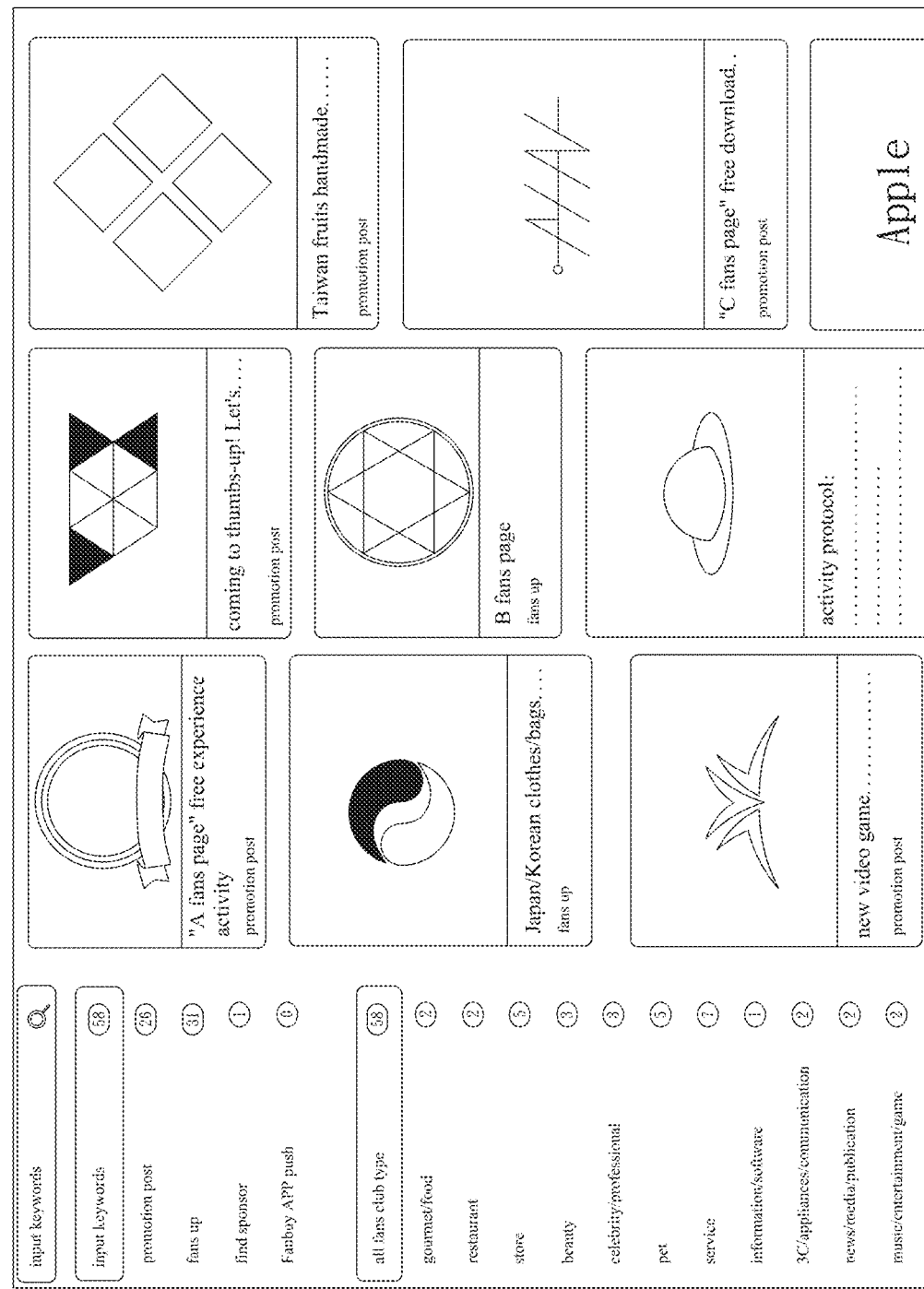
FIG. 8 shows finding collaboration webpage of one embodiment of the present invention.

Refer to FIG. 6 and FIG. 8, when the user end enters the third party collaboration match-up website, the user end can click "find collaboration", and the user end now is the support end as described in the present invention. By clicking "find collaboration", the user end proposes assistance request to the match-up module, and the match-up module is able to provide a "find collaboration webpage" to the support end. On right hand side of "find collaboration webpage", there are some collaboration information of each demand end shown as separated collaboration options with collaboration project name and figure of collaboration information. Below the collaboration option is the collaboration project type. The user end (support end) can select collaboration option in "find collaboration webpage" as the collaboration object. The aforementioned part of one embodiment represents features of "executing the match-up module to retrieve at least one of the collaboration information and the corresponding demand end, and executing the match-up module to provide collaboration information and corresponding demand end information to the support end, and provide selection ability to each support end to determine whether to collaborate with any demand end".

Further, refer to FIG. 9, when the match-up module acknowledges that the user end (support end) click one collaboration option (taking post promotion as example), the match-up module is configured to shows all contents of the collaboration information issued by the demand end on a "preview collaboration webpage". The content comprises a figure, a collaboration project name, a collaboration project type, a population number of fans group needed to collaborate with, a type of fans group needed to collaborate with, and a collaboration description, and a "confirm to collaborate" option (shown as "collaborate together" in this embodiment). Then the user end click the "confirm to collaborate" option, that means the user end (support end) issues a request collaboration message in response to the collaboration information issued by the demand end. The aforementioned description is equivalent to the feature of "executing the match-up module to generate a request collaboration message according to the collaboration information of the demand end selected by the support end and executing the match-up module to transmit the message to the demand end" of the present invention.

Figure 10:
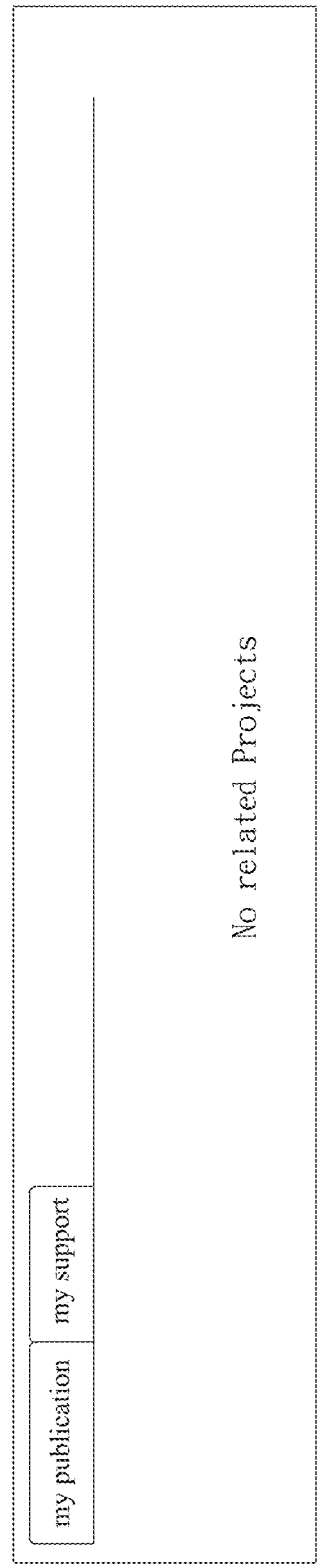
FIG. 10 shows collaboration progress webpage of one embodiment of the present invention.
Figure 11:
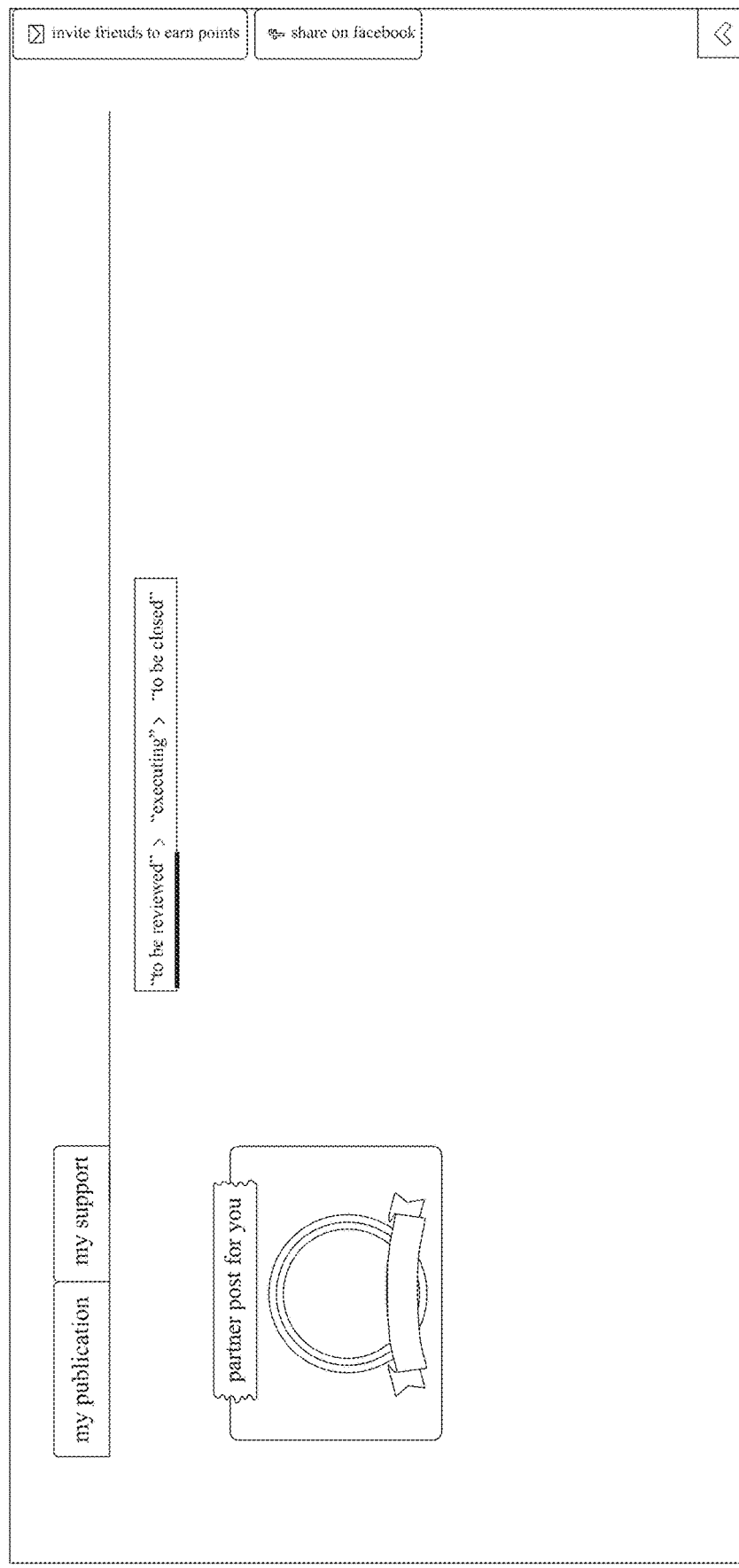
FIG. 11 shows "webpage published by myself" of one embodiment of the present invention.

Refer to FIG. 10, when the match-up module receives the status that the user end selects the option of "collaboration progress" on "match-up webpage" and enters "collaboration progress webpage", and then the match-up module acknowledges that the user end click "published by myself" option on "collaboration progress webpage", then a "webpage published by myself" is outputted as shown in FIG. 11. At this time, the user end is the demand end of the present invention. The match-up module is configured to show "demand to be reviewed", "demand to be executed", and "demand to be closed" options on "webpage published by myself", wherein the "demand to be reviewed", "demand to be executed", and "demand to be closed" options are shown as "to be reviewed", "executing", and "to be closed" on collaboration progress webpage.

Refer to FIG. 11, when the user end click "demand to be reviewed" (to be reviewed) option, then match-up module is configured to show the demand to be reviewed webpage in response to the request of support end asking the demand end to response the request collaboration message, and show each "demand to be reviewed option" on the "demand to be reviewed webpage". Each "demand to be reviewed option" comprises figures of collaboration information, collaboration project type, collaboration project name, and etc. to show the collaboration information to be reviewed by the demand end. If there is no "demand to be reviewed option", then a text or icon representing meaning of "no related collaboration information" would be shown. In the present invention, it takes collaboration information that each support end would assist as a project, and shown as "presently no related projects" in FIG. 10.

Figure 12:
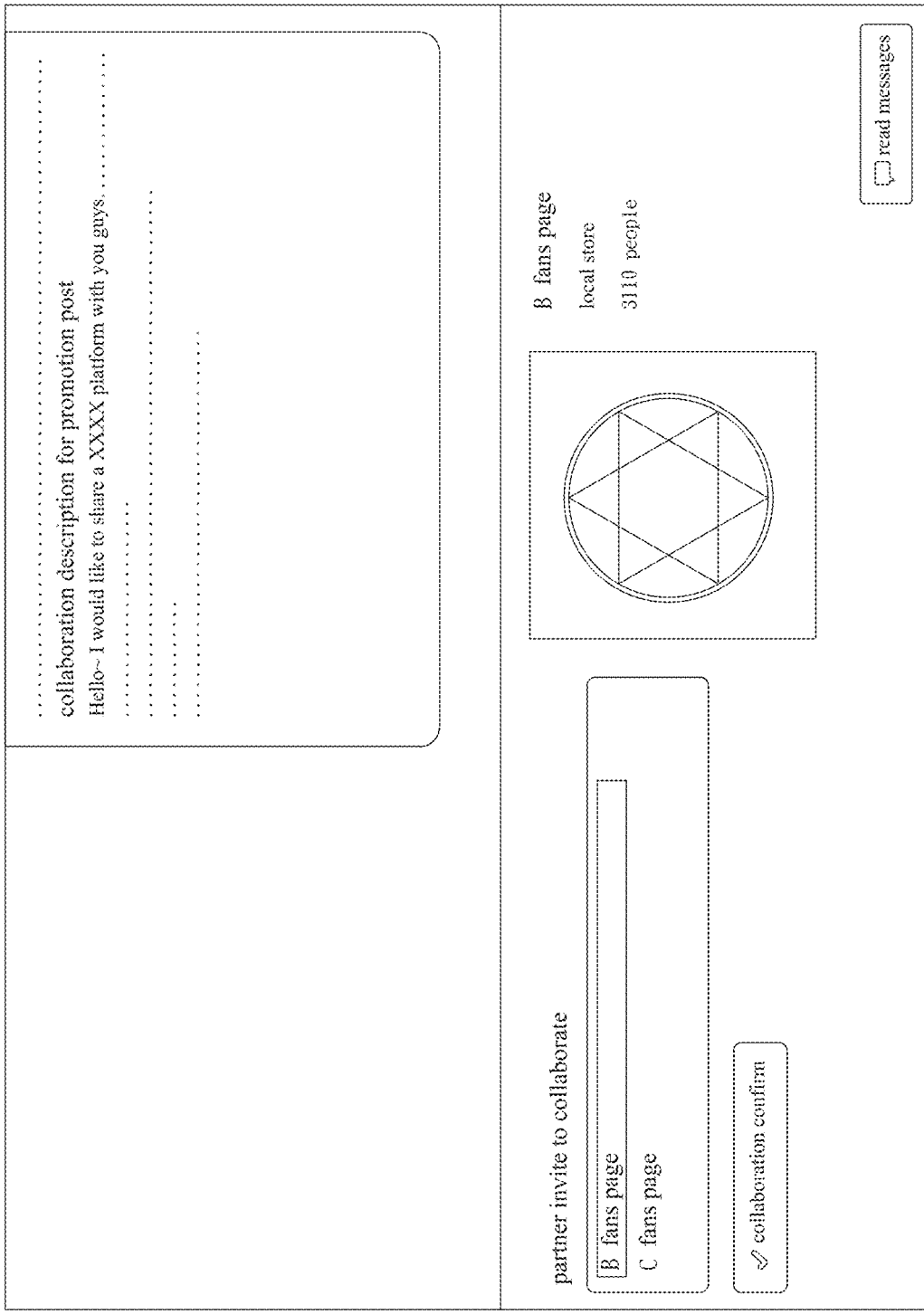
FIG. 12 shows "demand to be reviewed webpage" of one embodiment of the present invention.

Refer to FIG. 12, when the user end (demand end) clicks one "demand to be reviewed option", a "demand review webpage" is shown up. The "demand review webpage"

would show collaboration content and a confirm collaboration option corresponding to the "demand to be reviewed option", and then it is able to click confirmed collaboration options on "demand review webpage". This is equivalent to the feature of "executing the match-up module to generate a push message according to the agree collaboration message of the demand end" of the present invention.

Figure 13:
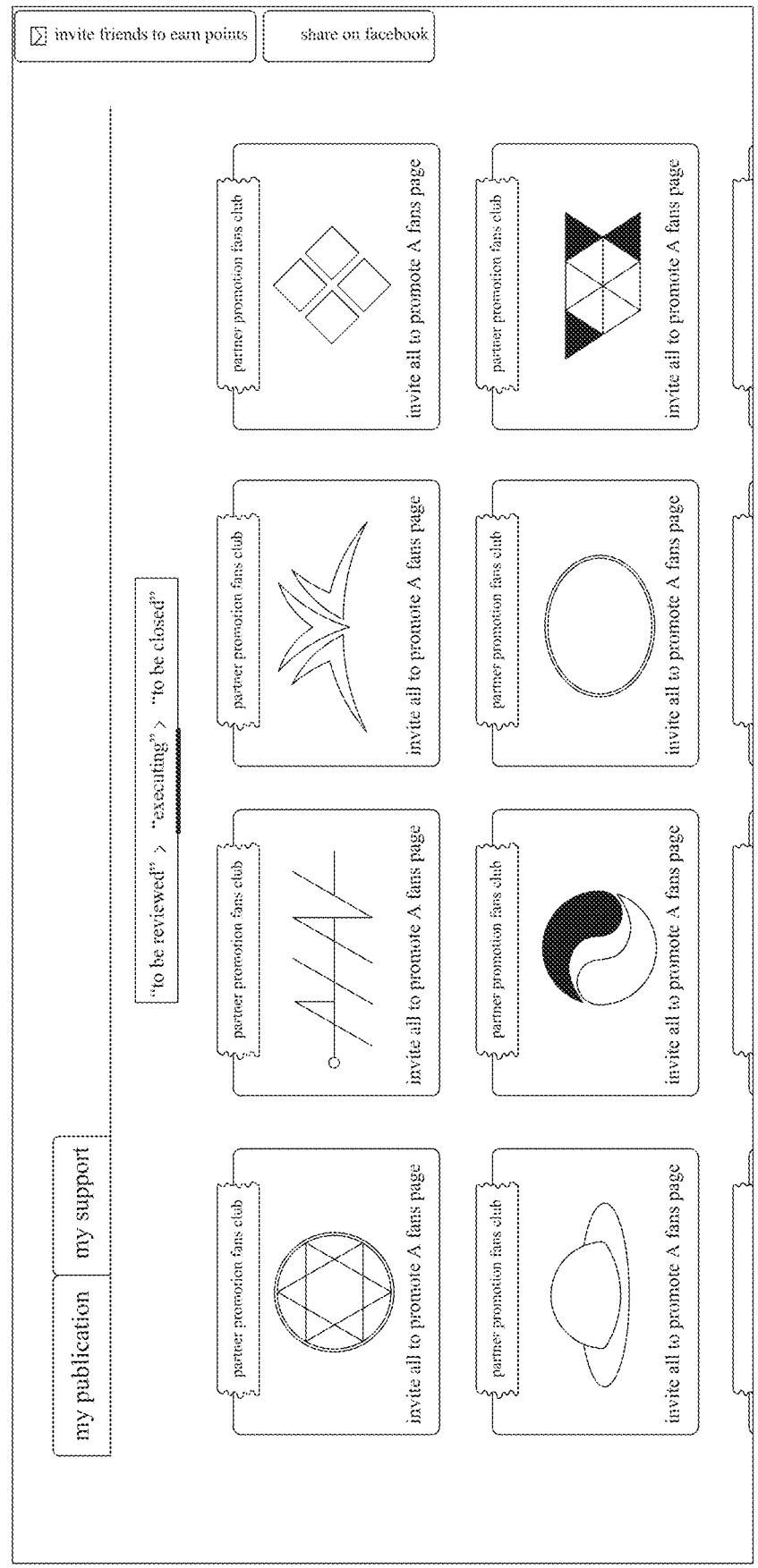
FIG. 13 shows "demand to be executed webpage" of one embodiment of the present invention.

Refer to FIG. 13, when the user click "confirm to collaborate" option, the match-up module would record the status of the reviewed collaboration information in a demand to be executed database. Later the user end (demand end) can click "demand to be executed" (executing) option on the webpage published by myself. Then the match-up module is configured to receive a message asking to check the execution of demand. At this time the match-up module shows the collaboration information on "demand to be executed webpage" from the demand to be executed database. The "demand to be executed webpage" shows several "demand to be executed options" separately representing the collaboration information being confirmed by the demand end but not executed by the support end. Thus the user end (demand end) is able to check how many collaboration information cases are still waiting for other user end (support end) to publish on webpage of the social network.

Also, the user end can click "demand to be execute option" on "demand to be executed webpage" (as shown in FIG. 13), and then click "cancel collaboration option" on "demand to be executed check webpage" (as shown in FIG. 14) to cancel the "demand to be executed option" corresponding to the "cancel collaboration option". This is equivalent to "executing the match-up module to generate a deny collaboration notice message according to the deny collaboration message of the demand end" of the present invention.

Refer to FIG. 15, when the user end (demand end) clicks "demand to be closed" (to be closed) option on the webpage published by myself, the match-up module is configured to show the "demand to be closed webpage" corresponding to the collaboration information that has been supported by the support end, and each "demand to be closed option" is shown on "demand to be closed webpage". Each "demand to be closed option" comprises figure of collaboration information, collaboration project type, and collaboration project name that represents the collaboration information to be closed by the demand end. Refer to FIG. 16, if the user end (demand end) clicks one of the "demand to be closed option", then a "demand to be closed confirm webpage" is shown on. The "demand to be closed confirm webpage" shows a "confirm to close option" and the collaboration information corresponding to the "demand to be closed option". To accomplish the collaboration relation between the demand end and the support end, it needs to click the "confirm to close option" (as shown in figure) on "demand to be closed confirm webpage".

Figure 17:
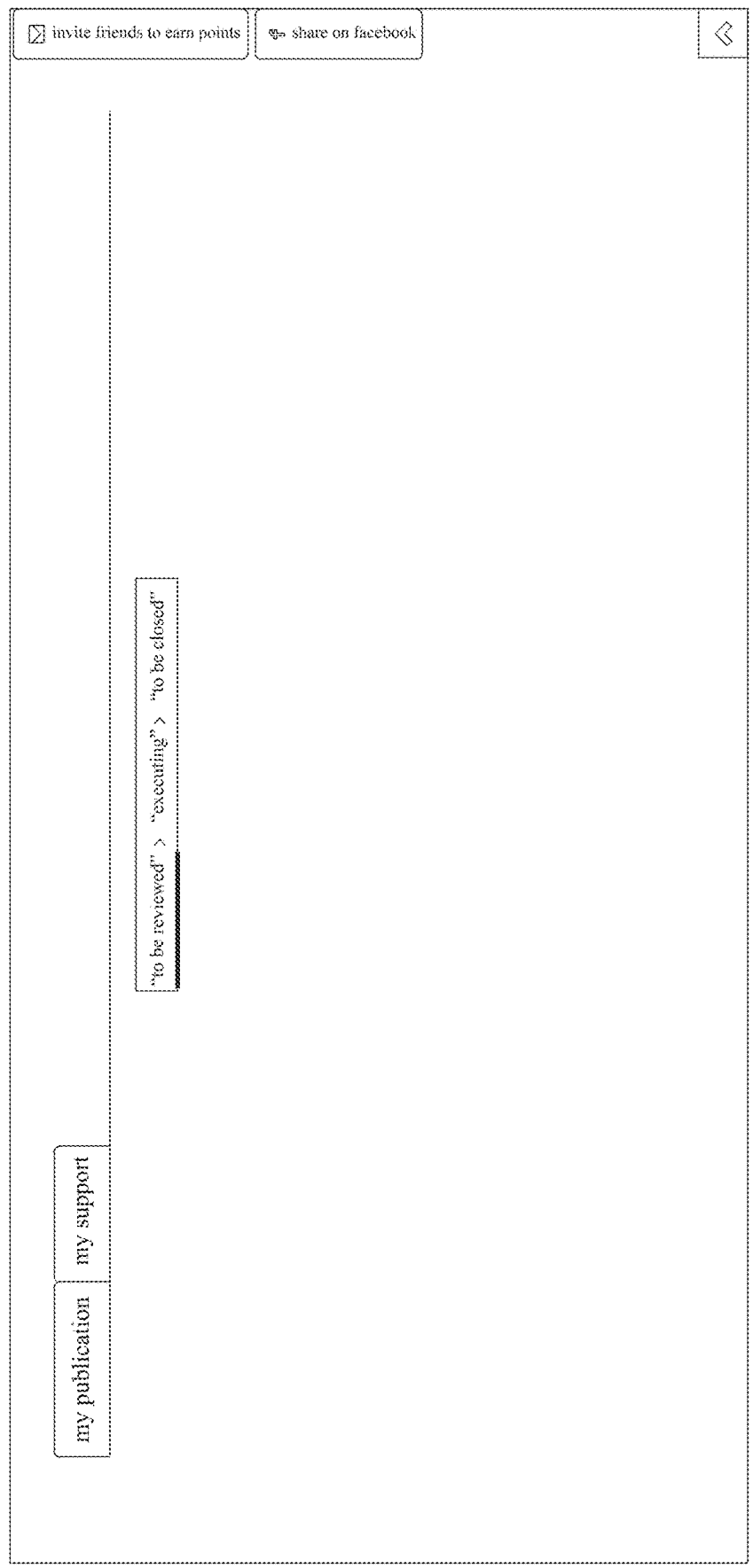
FIG. 17 shows "assisted by me webpage" of one embodiment of the present invention.

Refer to FIG. 10, when the match-up module acknowledges that the user end clicks the "collaboration progress" option on the "match-up webpage" and enters the "collaboration progress webpage", and then the match-up module acknowledges that the user end clicks "assisted by me" option on "collaboration progress webpage", the user end would enter an assisted by me webpage as shown in FIG. 17. At this time, the user end is the support end of the present invention. The match-up module would show "support to be review", "support to be executed", and "support to be closed" options on "assisted by me webpage". "Support to be review", "support to be executed", and "support to be closed" options on collaboration progress webpage are separately shown as waiting, executing, and to be closed.

Figure 18:
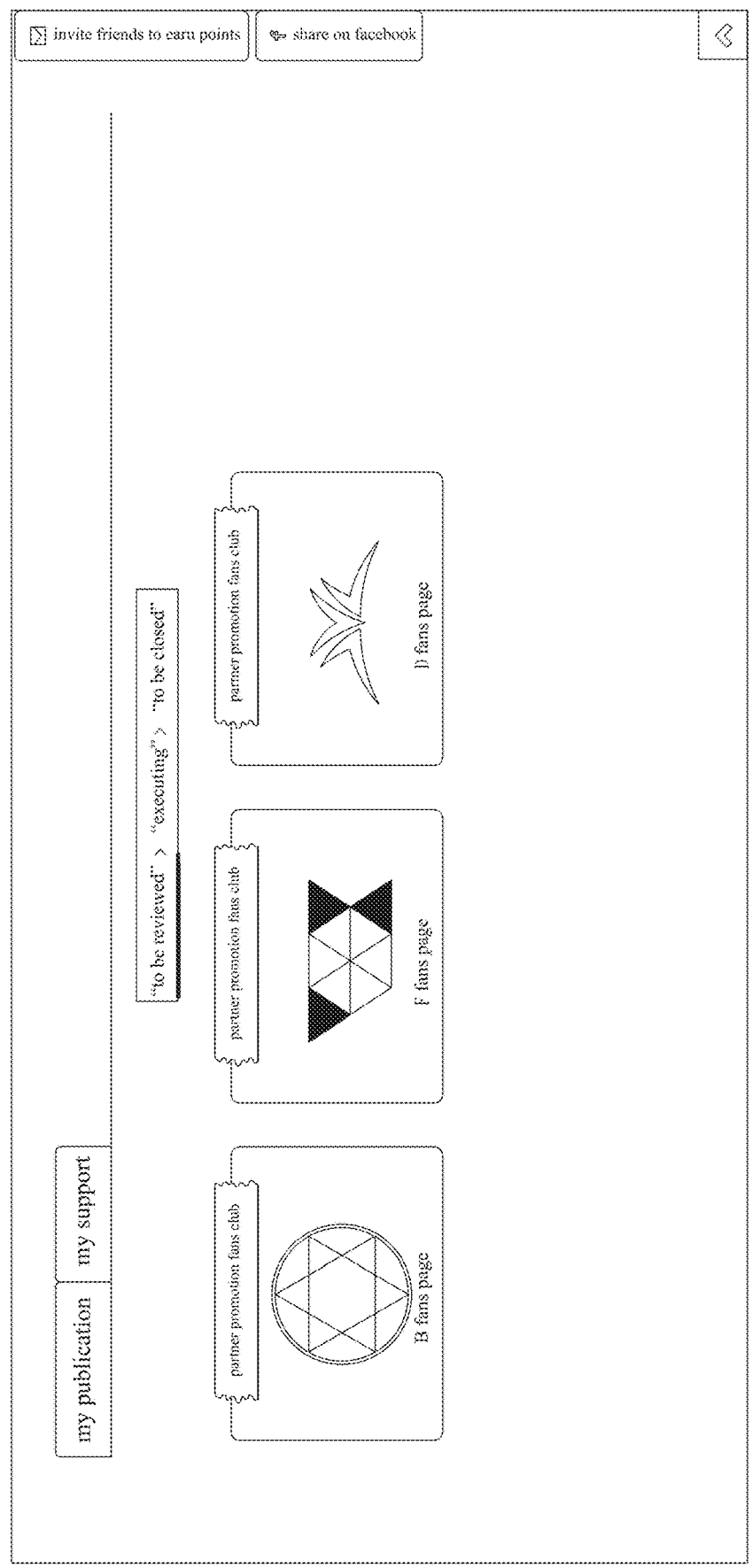
FIG. 18 shows "support to be reviewed webpage" of one embodiment of the present invention.
Figure 19:
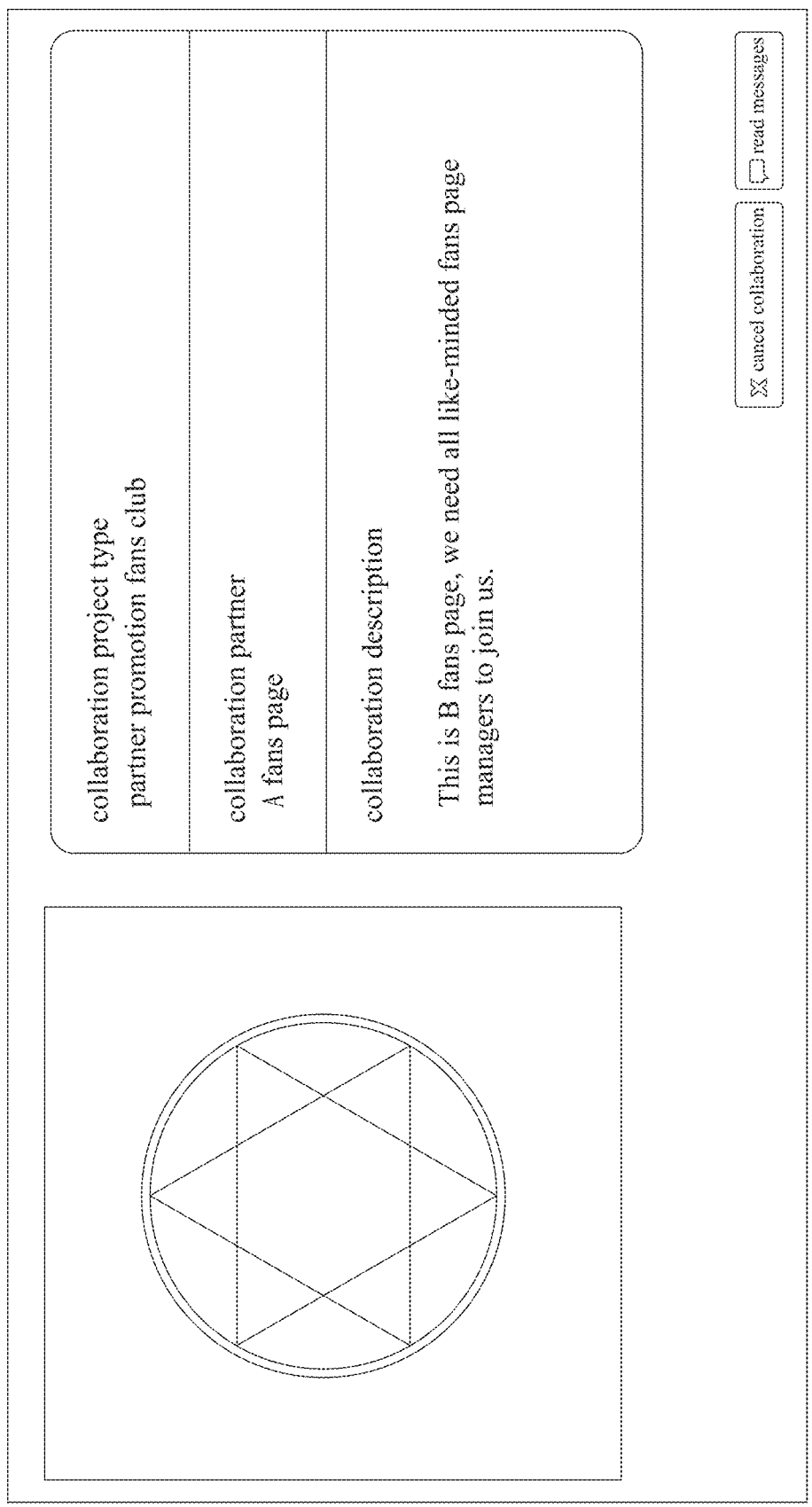
FIG. 19 shows "support to be reviewed option webpage" of one embodiment of the present invention.

Refer to FIG. 18, when the "support to be reviewed" (waiting) option is clicked, the match-up module outputs a "support to be reviewed webpage" to the user end (support end), and the "support to be reviewed webpage" outputs the "support to be reviewed options" of collaboration information corresponding to the issued support message of support end, such as the "partner promotion fans club" option shown in FIG. 18. This is not intended to limit the present invention, if there is other collaboration project type, there would be corresponding options. Refer to FIG. 19, when any "support to be reviewed option" is clicked, the match-up module outputs corresponding "support to be reviewed option webpage" to the user end. The "support to be reviewed option webpage" outputs content of each collaboration information consented by the support end (and the support message is issued). In this embodiment, the related content shows collaboration project type, collaboration partner (i.e. the demand end) and collaboration description. More particularly, there is a "cancel collaboration option" to let the user end (support end) click it to cancel the collaboration option, that is, to cease the demand end issuing the collaboration information.

Figure 20:
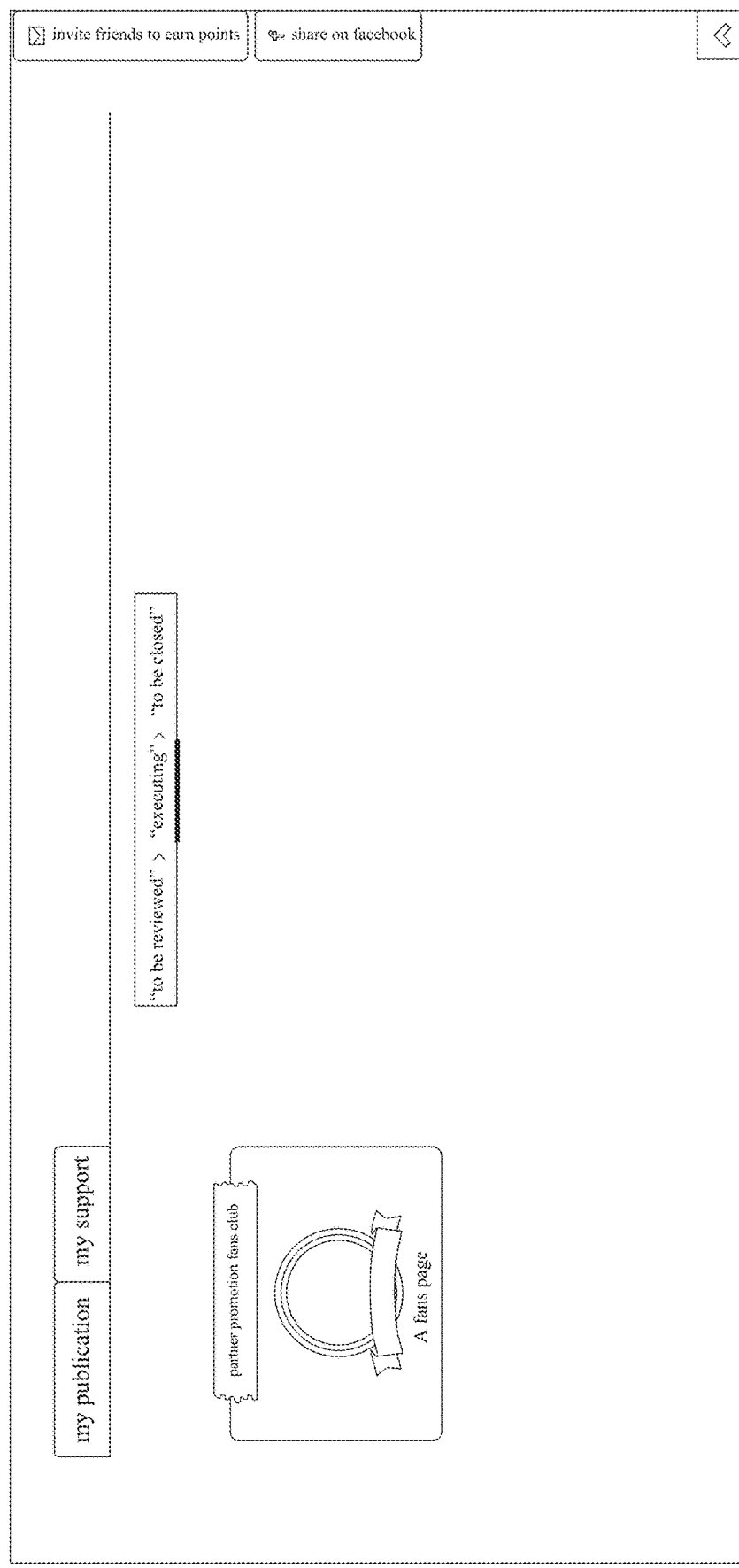
FIG. 20 shows "support to be executed webpage" of one embodiment of the present invention.
Figure 21:
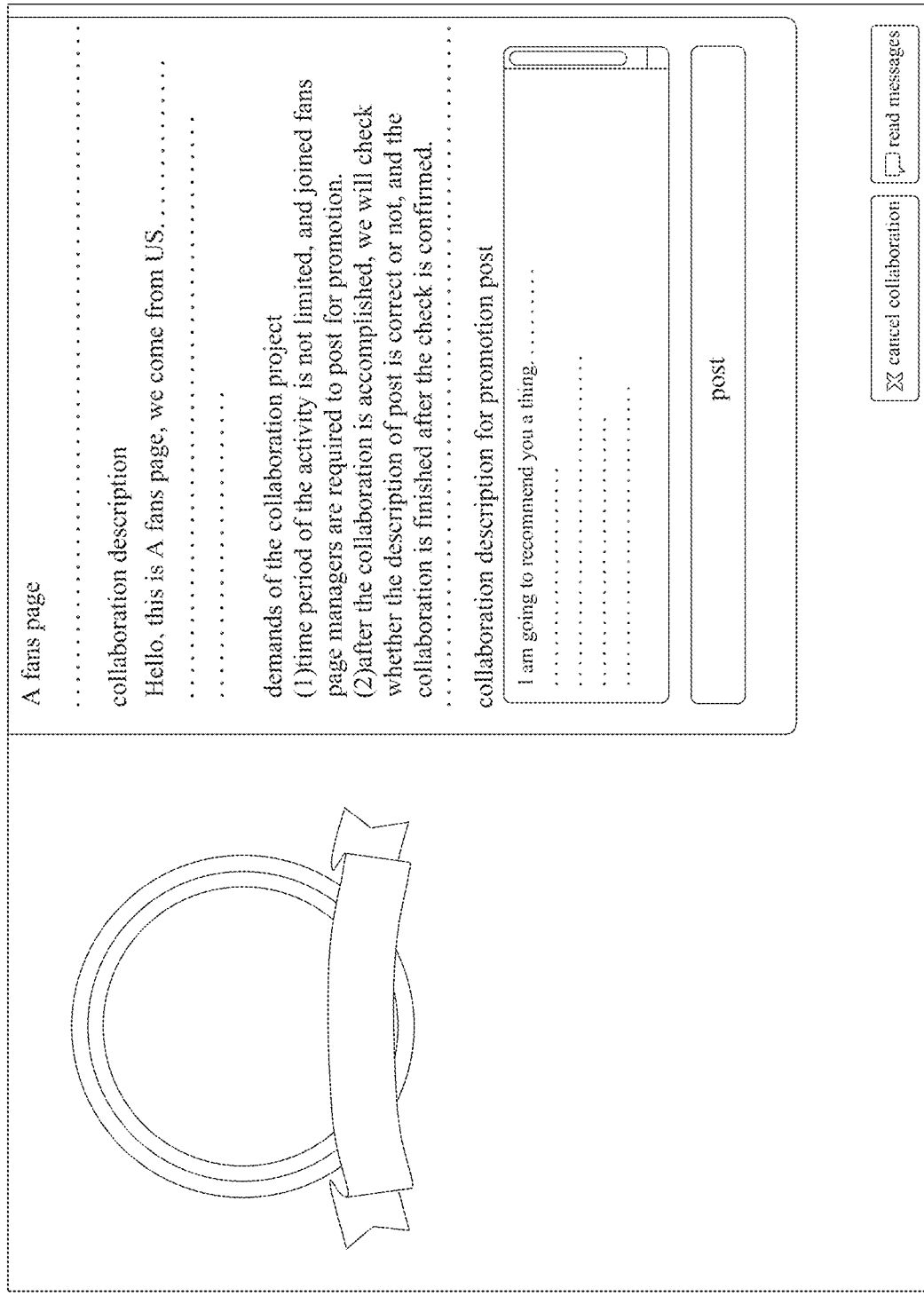
FIG. 21 shows "support to be executed option webpage" of one embodiment of the present invention.

Refer to FIG. 20, when the "support to be executed" (executing) option is clicked, the match-up module outputs a "support to be executed webpage" to the user end, and the "support to be executed webpage" comprises each "support to be executed option" of corresponding collaboration information, such as the "partner post for you" option. This is not intended to limit the present invention, if there is other collaboration project type, there would be corresponding options. Refer to FIG. 21, when any "support to be executed option" is clicked, the match-up module outputs corresponding "support to be executed option webpage" to the user end. The "support to be executed option webpage" comprises all corresponding collaboration information, such as name of demand end, collaboration description, text content of the promoting post, post option to issue, and option to cancel collaboration.

Figure 22:
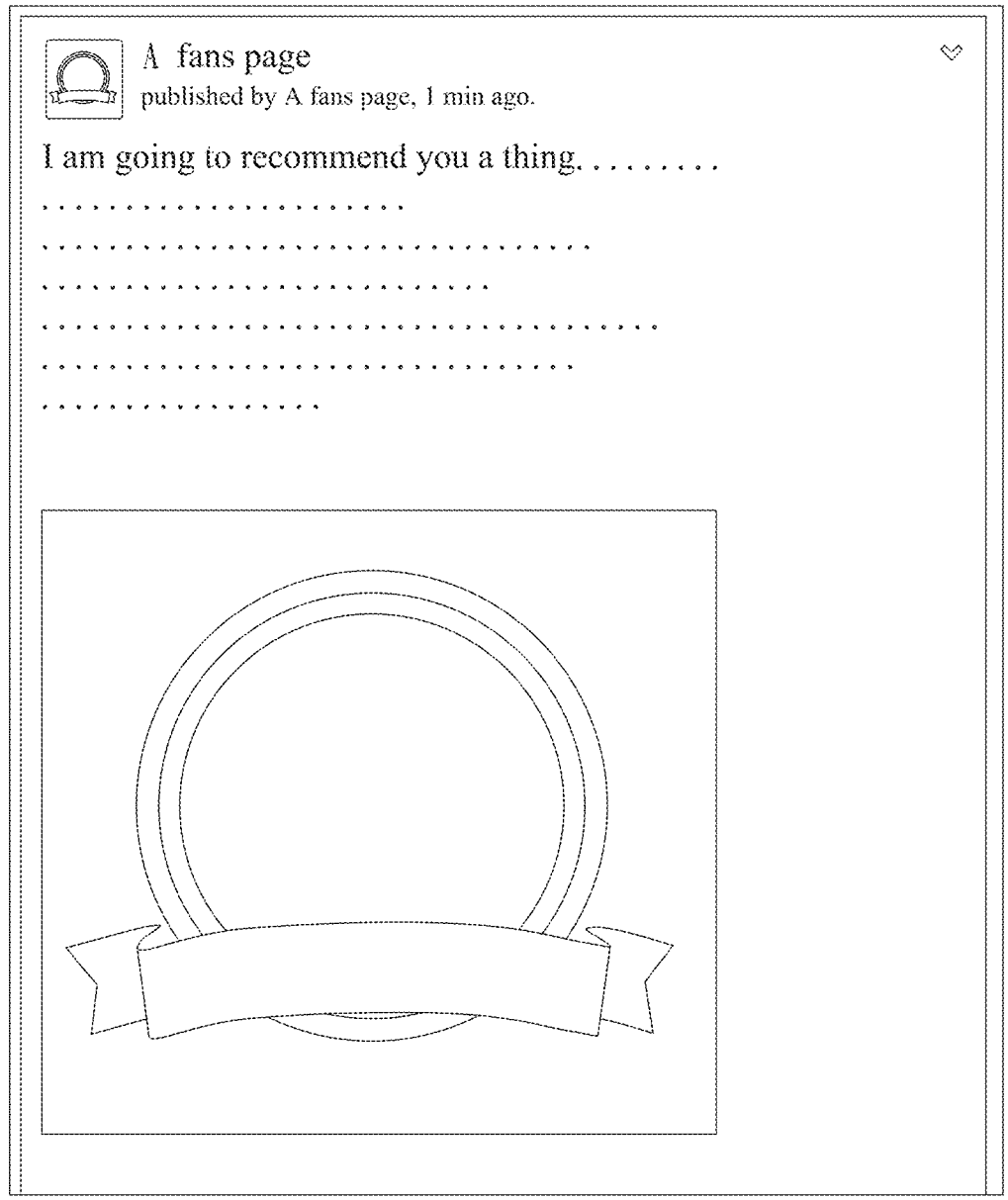
FIG. 22 shows that support end publishes the collaboration content of the collaboration information of one embodiment of the present invention.

If the "post option to issue" on the "support to be executed webpage" is clicked, then the push module outputs the collaboration content of the collaboration information on the social network webpage of the user end (support end), as shown in FIG. 22. This is equivalent to the feature of "the push module is configured to retrieve the collaboration information of the selected demand end from the information storage unit according to the push message, and publish the collaboration information of the selected demand end on the exclusive webpage of the support end on the social network." of the present invention. Also, when the "option to cancel collaboration" is clicked, the match-up module is configured to cancel the assistance request of collaboration information corresponding to the "support to be executed option".

Figure 23:
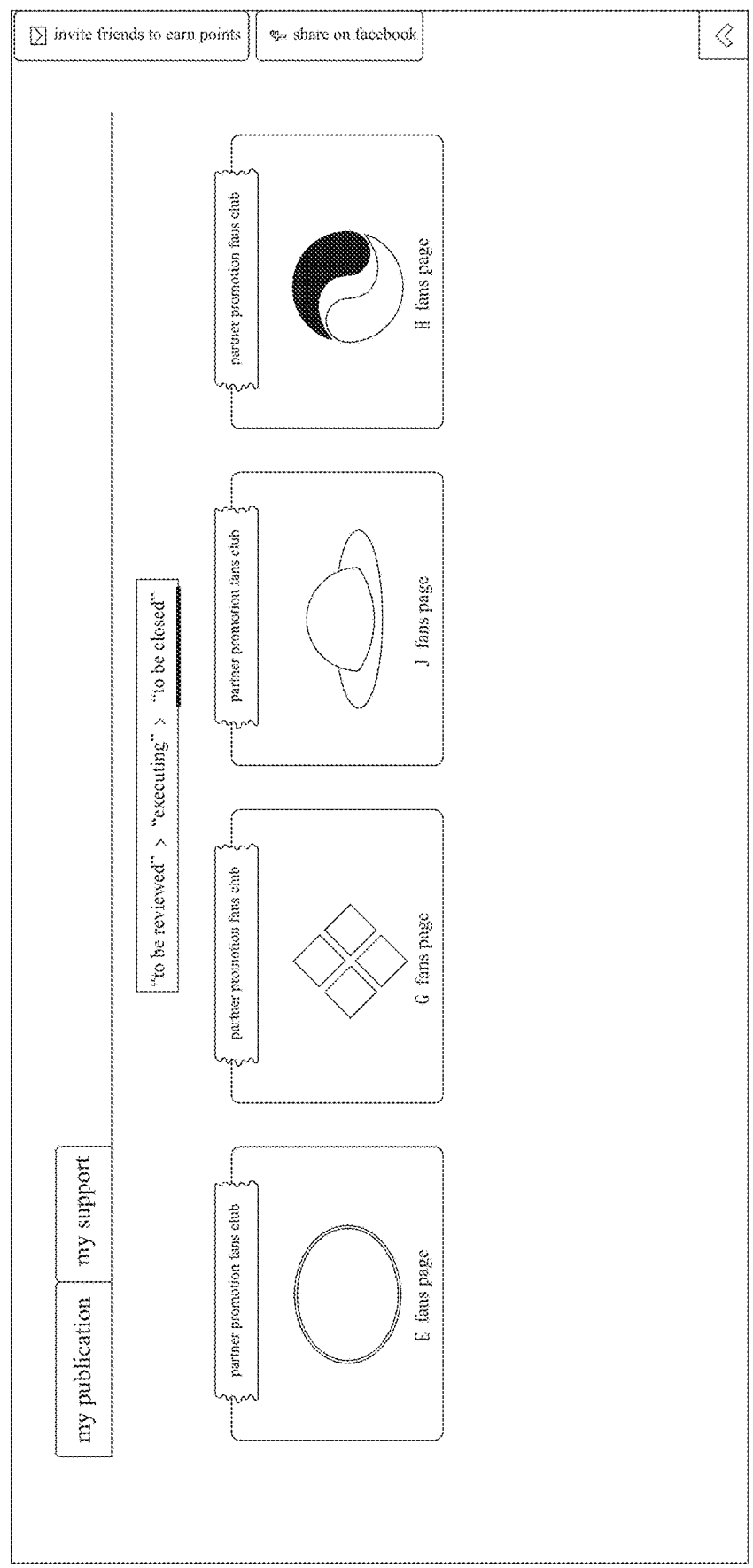
FIG. 23 shows "support to be closed webpage" of one embodiment of the present invention.

Refer to FIG. 23, when the user end clicks "post option to issue", the match-up module records the "support to be closed" message of the issued collaboration information in a "support to be closed" database of the system. When the user end (demand end) clicks the "support to be closed" option, the match-up module receives a "check support to be closed" message. That is, the match-up module is configured to show the issued collaboration information on the "support to be closed webpage" from the "support to be closed" database. The "support to be closed webpage" shows corresponding collaboration information of collaboration type, collaboration project name, and figures, and show s each issued collaboration information which is awaiting to be confirmed by the demand end.

Figure 24:
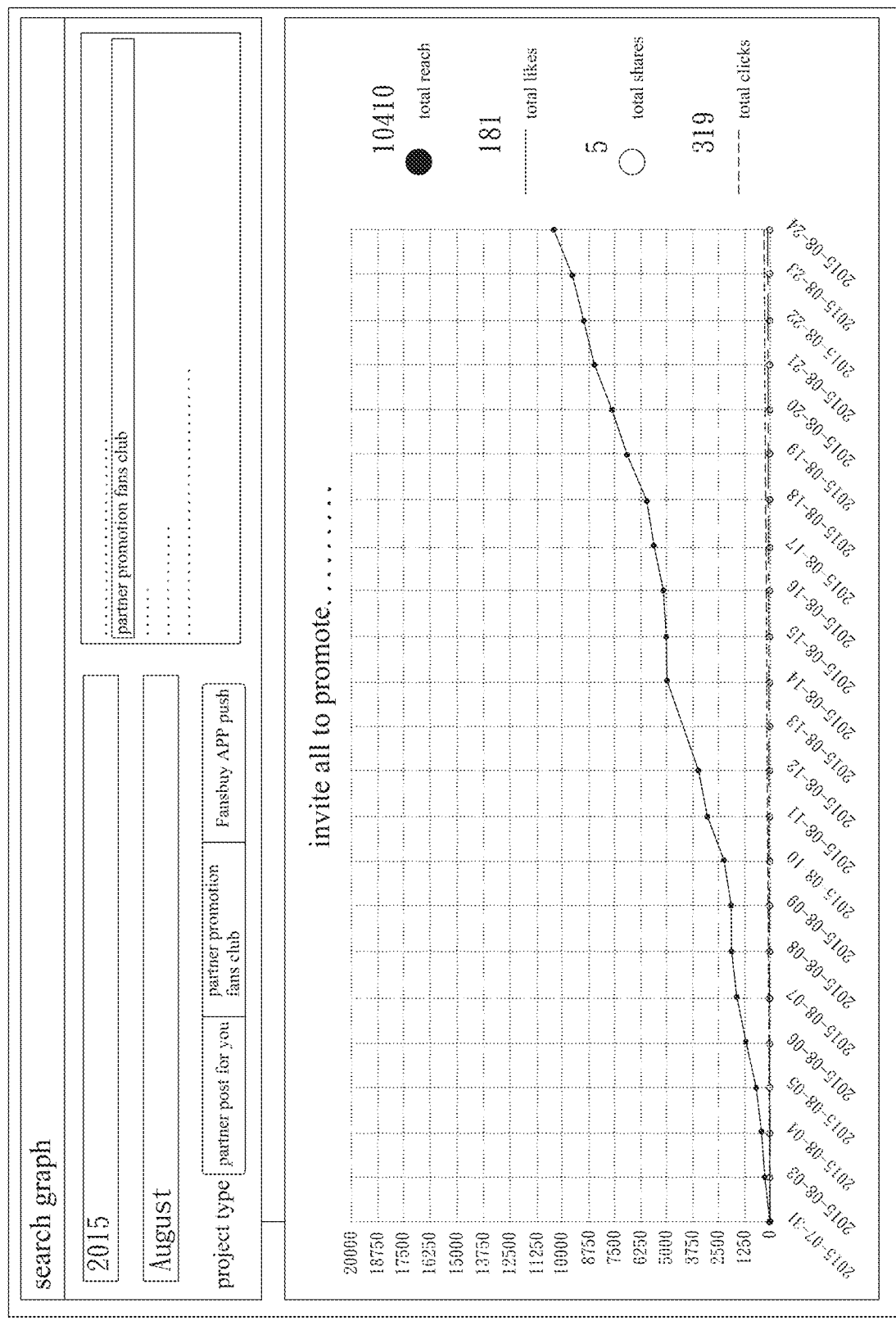
FIG. 24 shows graphic statistics webpage of one embodiment of the present invention.

Refer to FIGS. 6 and 24, when the match-up module confirms that the user end clicks "graphic statistics" option on "match-up website", it enters "graphic statistics" webpage. The user end is able to select search time and search category. Search time means the time period that the collaboration information of the demand end being published on the support end. Search category means one of collaboration information of "promoting post", "increase fans number", "finding sponsor", and "app pushing". In any category, it is able to view the statistics of any collaboration information. When the match-up module receives the request that the user end has selected a search time and clicked one collaboration information of the search category, it outputs statistics such as the reach rate, "like" click number, share number, and total hit number of the collaboration information in support end. This is equivalent to the embodiment of the data collation module, statistics database and data output module of the present invention. That is, when the match-up module receives the request that the user end has selected a search time and clicked one collaboration information of the search category, the data collection module enters the social network website to retrieve the statistics such as the reach rate, "like" click number, share number, and total hit number of the collaboration information published on the support end, and stores these data in the statistics database. Then the data output module outputs each statistics data. In the embodiment of the present invention, it takes Facebook fans webpage as an example, but not to limit the present invention. For example, fans webpage and microdata of Sino Weibo, Google+, Twitter, LinkedIn, or other similar function shall be deemed as within the scope of the present invention.

As aforementioned, the present invention is able to make the user end to support and publish collaboration information on third party collaboration information match-up website among members of the social network, which makes the exposure level of website of each user end in social network increase and may possible result increase of fans number or attention number. It is also possible to review whether the collaboration information is issued or not. It is known that the present invention greatly improve the drawback of conventional social network.

The aforementioned description is for understanding the present invention and not to limit it. Any equivalent modification or change of the present invention without departing from the present invention, shall be deemed as within the scope of claims.

What is claimed is:

1. A social network information match-up system, the system being configured on a webserver to be connected to a social network website, a plurality of demand ends and a plurality of support ends, the plurality of demand ends and support ends being members of the social network website, the system comprising:
   a processor;
   an information storage unit;
   a match-up module, stored in the information storage unit and executed by the processor,
   wherein the match-up module is configured to receive a collaboration information from each demand end, wherein the collaboration information is going to be inputted in the demand end and comprises collaboration status description and assistance request content, wherein the collaboration status description comprises facts and requirements of a collaboration project, wherein the assistance request content comprises content of the collaboration project,
   wherein the match-up module is configured to store the collaboration information and source information representing an input source of the demand end in the information storage unit,
   wherein the match-up module is configured to retrieve at least one collaboration information and the source information representing the input source of a corresponding demand end which is stored in the information storage unit to the support end according to a support request from each support end, and the support end is able to select whether to collaborate with one of the demand ends,
   wherein the match-up module is configured to generate a push message according to an agree collaboration message that the support end is willing to collaborate with the demand end from the support ends; and
   a push module, stored in the information storage unit and executed by the processor, being configured to receive the push message from the match-up module, wherein the push module is configured to retrieve the collaboration information of the selected demand end from the information storage unit according to the push message, and publish the assistance request content of the collaboration information of the selected demand end on an exclusive webpage of the support end on the social network website.

2. The social network information match-up system as claimed in claim 1, further comprising a log-in module, wherein the log-in module is configured to be provided to each demand end and support end for logging in the match-up system, and to enable each application function of the demand end or support end to be used by the match-up system that is restricted before logging in the social network website, and to become one user end of the match-up system thus the push module is able to publish the supporting request on the exclusive webpage of the support end on the social network website.

3. The social network information match-up system as claimed in claim 1, further comprising a data collection module, a statistics database, and a data output module, wherein the data collection module is configured to connect to the match-up module and the statistics database, the data collection module is configured to collect the activity status statistics data of the user end on the exclusive webpage of the social network website, and the data collection module is configured to collect the use status statistics data in the match-up module, and store the activity status statistics data and the use status statistics data in the statistics database;
   wherein the activity status statistics data comprises the type of the exclusive webpage of the user end, the reach rate, "like" click number, share number, and total hit number of each supporting request on the exclusive webpage, fans number or attender number of supporter, wherein the use status statistics data of the match-up system represents the supporting number of the user end as the support end, the number of being helped by the support end as a demand end, or the mutual supporting number among each user end;
   wherein the data output module is connected to the match-up module and the statistics database, and is configured to confirm that the user end as the demand end has been matched up successfully according to the collaboration information from the match-up module in response to the data search request inputted by the user end, and then to output the activity status statistics data to the user end from the statistics database, wherein the activity status statistics data represents the supporting request of the user end as the demand end being published by the supporting end.

4. The social network information match-up system as claimed in claim 1, wherein the match-up system further comprises a recommend module being connected to the statistics database, and the recommend module at least comprises a match-up recommend criteria combination and a support recommend criteria combination;

wherein the match-up recommend criteria combination comprises at least one of the activity status statistics data and at least one of the use status statistics data related to the present user end for generating at least one another user end as the recommended candidate to be outputted on the output screen of the present user end after logging in the system;

the support recommend criteria combination comprises at least one of the activity status statistics data and at least one of the use status statistics data and collaboration information for generating at least one recommended demand candidate representing one another user end as the demand end requesting assistance by support end to be outputted on the output screen of the present user end after logging in the system.

5. The social network information match-up system as claimed in claim 4, wherein the collaboration information comprises a collaboration mode description and an assistance request description, wherein the collaboration mode description comprises a figure, a collaboration project name, a collaboration project type, a population number of fans group needed to collaborate with, a type of fans group needed to collaborate with, and a collaboration description, and the assistance request description comprises at least one or combination of text, image, video, and hyperlink.

6. A social network information match-up method performed by a match-up system configured on a webserver, wherein the match-up system is connected to a social network website, a plurality of demand ends and a plurality of support ends, and the plurality of demand ends and support ends are members of the social network website, the method comprising steps of:

executing a match-up module of the match-up system to receive collaboration information from each demand end;

storing the collaboration information and a source information representing an input source of the demand end in an information storage unit of the match-up system;

executing the match-up module to retrieve at least one collaboration information and the source information stored in the information storage unit and transmit to the support end according to a support request from each support end;

executing the match-up module to provide selection ability to each support end to determine whether to collaborate with one of the demand ends;

executing the match-up module to generate a push message according to the collaboration information of the demand end selected by the support end;

executing the match-up module to transmit the push message to a push module of the match-up system;

executing the push module to retrieve assistance request content of the collaboration information of the selected demand end from the information storage unit according to the push message request content, wherein the assistance request content comprises content of the collaboration project; and executing the push module to publish the assistance request content of the collaboration information of the selected demand end on an exclusive webpage of the support end on the social network website.

7. The social network information match-up method as claimed in claim 6, wherein before executing the match-up module to receive at least one collaboration information from at least one demand end, or before the support end issuing the support request, it further comprises a step of providing a log-in module to each demand end or support end for logging in the match-up system and to execute the match-up system to access each application function of the demand end or support end released on the social network website after log-in, and to become a user end of the match-up system, wherein the related information of the user end is configured to be retrieved form the social network website, and the user end is configured to publish the support request content on the exclusive webpage of the social network website when the user end is treated as a support end.

8. The social network information match-up method as claimed in claim 6, wherein when the match-up module is able to access the application function released by the social network website, the social network information match-up system is configured to execute a data collection module being configured to collect an activity status statistics data of the user end on the exclusive webpage of the social network website, and the data collection module is configured to collect a use status statistics data in the match-up module, and store the activity status statistics data and the use status statistics data in a statistics database.

9. The social network information match-up method as claimed in claim 8, wherein after the social network information match-up system stores the activity status statistics data and the use status statistics data in the statistics database, when a data output module of the match-up system receives a data search request, the data output module is configured to output the activity status statistics data to the user end from the statistics database, wherein the activity status statistics data represents the supporting request of the user end as the demand end being published by the supporting end, wherein the activity status statistics data comprises the reach rate, "like" click number, share number, and total hit number of each supporting request on the exclusive webpage, fans number or attender number of supporter, wherein the use status statistics data of the match-up system represents the supporting number of the user end as the support end, the number of being helped by the support end as a demand end, or the mutual supporting number among each user end.

10. The social network information match-up method as claimed in claim 9, wherein the match-up system further comprises a recommend module, and when each demand end or support end registers in the match-up system, the match-up system is configured to execute following steps of:

executing the recommend module to generate at least one another user end as the recommended candidate to be outputted on the output screen of the present user end after logging in the system according to a predetermined match-up recommend criteria combination, and the match-up recommend criteria combination comprises at least one of the activity status statistics data and at least one of the use status statistics data related to the present user end;

executing the recommend module to generate at least one recommended demand candidate representing one another user end as the demand end requesting assistance by support end to be outputted on the output screen of the present user end after logging in the system according to a predetermined support recommend criteria, and the support recommend criteria combination comprises at least one of the activity status statistics data and at least one of the use status statistics data and collaboration information.

11. The social network information match-up method as claimed in claim 10, wherein after the match-up system receives the collaboration information from each demand end, the match-up system is configured to execute the following steps of:

executing the recommend module to generate at least one another user end as the recommended candidate to be outputted on the output screen of the present user end after logging in the system according to a predetermined initiative recommend criteria combination, and the initiative recommend criteria combination comprises at least one of the activity status statistics data and at least one of the use status statistics data related to the present user end;

after the match-up module receives the collaboration information of each demand end, executing the match-up module to output each recommended support end for the demand end to select;

executing the match-up module to issue an initiative request assistance message to the selected recommended support ends;

when the user end, as the recommended support end, receives the initiative request assistance message, executing the match-up module to generate an option of agree the initiative assistance message and an option of deny the initiative assistance message for the user end, as the recommended support end, to select;

when the user end, as the recommended support end, agrees to the initiative assistance option, executing the match-up module to generate the push message and the match-up module transmits the push message to the push module;

executing the push module to retrieve the content of the support request of the collaboration information of the demand end that issues the initiative request assistance message from the information storage unit according to the push message;

executing the push module to publish the content of the support request on the exclusive webpage of the user end, as the recommended support end, on the social network website;

when the user end, as the recommended support end, denies the initiative assistance option, executing the match-up module to generate the deny collaboration notice message;

executing the match-up module to transmit the deny collaboration notice message to the support end.

* * * * *